US008331315B2

(12) United States Patent
Purkayastha et al.

(10) Patent No.: US 8,331,315 B2
(45) Date of Patent: Dec. 11, 2012

(54) MEDIA INDEPENDENT HANDOVER FOR SMART PHONE ARCHITECTURE

(75) Inventors: Debashish Purkayastha, Pottstown, PA (US); Shamim Akbar Rahman, Montreal (CA); Khalid S. Hossain, Montreal (CA); Michelle Perras, Montreal (CA); Hyun Wook Kim, Kyunggi-Do (KR); Yong Sun Cho, Seoul (KR); Suan Eoh, Seoul (KR); Jean-Ian Boutin, Montreal (CA)

(73) Assignees: InterDigital Technology Corporation, Wilmington, DE (US); SK Telecom, Co. Ltd., Seoul (KR)

( * ) Notice: Subject to any disclaimer, the term of this patent is extended or adjusted under 35 U.S.C. 154(b) by 998 days.

(21) Appl. No.: 12/209,772

(22) Filed: Sep. 12, 2008

(65) Prior Publication Data

US 2009/0161629 A1 Jun. 25, 2009

Related U.S. Application Data

(63) Continuation-in-part of application No. 11/862,963, filed on Sep. 27, 2007, now Pat. No. 7,894,400.

(60) Provisional application No. 60/890,273, filed on Feb. 16, 2007, provisional application No. 60/939,387, filed on May 22, 2007, provisional application No. 60/972,106, filed on Sep. 13, 2007.

(51) Int. Cl.
*H04W 36/00* (2009.01)
(52) U.S. Cl. ............................................. 370/331
(58) Field of Classification Search .......... 370/310, 370/328, 329, 331; 455/403, 422.1, 436
See application file for complete search history.

(56) References Cited

U.S. PATENT DOCUMENTS 7,167,459 B2   1/2007  Spear et al.
7,440,757 B2  10/2008  Kwon et al.
(Continued)

FOREIGN PATENT DOCUMENTS

KR   2005-0053869   6/2005
(Continued)

OTHER PUBLICATIONS

IEEE, "IEEE Standard for Local and Metropolitan Area Networks", Part 16: Air Interface for Fixed Broadband Wireless Access Systems, IEEE Std 802.16/2004, (Oct. 1, 2004).
(Continued)

*Primary Examiner* — Chi Pham
*Assistant Examiner* — Robert Lopata
(74) *Attorney, Agent, or Firm* — Volpe and Koenig, P.C.

(57) ABSTRACT

A wireless transmit/receive unit (WTRU) may include two or more modems, each configured to link to a different network, and a media independent handover (MIH) client. An application programming interfaces (API) may provide the MIH client with mechanisms to receive information about links, control the modems for handover, discover a MIH server and IP multimedia system nodes, trigger mobile IP handover, etc. If a link has been successfully established, the MIH client may start a MIH session. When the modem indicates that a connection is going to be terminated, the MIH client may activate the second modem for handover. If the first modem indicates that a link parameter has crossed a threshold, the MIH client may send signal measurements to a MIH server. After receiving a media independent handover switch request, the MIH client may initiate handover to the second network.

18 Claims, 9 Drawing Sheets

U.S. PATENT DOCUMENTS

| | | | |
|---|---|---|---|
| 7,483,984 | B1 | 1/2009 | Jonker et al. |
| 7,496,364 | B2 * | 2/2009 | Hoghooghi et al. .......... 455/436 |
| 7,536,184 | B2 * | 5/2009 | Poczo ......................... 455/432.3 |
| 7,583,635 | B2 * | 9/2009 | Kwak et al. .................... 370/331 |
| 7,606,200 | B2 * | 10/2009 | Kwak et al. .................... 370/331 |
| 7,715,842 | B2 * | 5/2010 | Kim et al. ..................... 455/436 |
| 7,738,882 | B2 * | 6/2010 | Dutta et al. ................. 455/456.1 |
| 7,746,825 | B2 | 6/2010 | Olvera-Hernandez et al. |
| 2005/0249161 | A1 * | 11/2005 | Carlton ........................ 370/331 |
| 2006/0268782 | A1 | 11/2006 | Kwak et al. |
| 2006/0268784 | A1 | 11/2006 | Lee et al. |
| 2006/0276190 | A1 | 12/2006 | Shaheen |
| 2007/0060097 | A1 | 3/2007 | Edge et al. |
| 2007/0173283 | A1 * | 7/2007 | Livet et al. ................. 455/552.1 |
| 2007/0249348 | A1 * | 10/2007 | Park .............................. 455/436 |
| 2008/0175253 | A1 * | 7/2008 | Rahman et al. .......... 370/395.52 |
| 2008/0219215 | A1 * | 9/2008 | Olvera-Hernandez et al. ............... 370/331 |
| 2008/0304454 | A1 | 12/2008 | Zhong et al. |
| 2009/0201842 | A1 * | 8/2009 | Guan ............................. 370/310 |

FOREIGN PATENT DOCUMENTS

| | | |
|---|---|---|
| WO | 2005/076649 | 8/2005 |
| WO | 2006/063330 | 6/2006 |

OTHER PUBLICATIONS

3GPP, "3$^{rd}$ Generation Partnership Project; Technical Specification Group Terminals; AT Command Set for User Equipment (UE) (Release 5)", 3GPP TS 27.007 V5.6.0, (Mar. 2005).

3GPP, "3$^{rd}$ Generation Partnership Project; Technical Specification Group Services and System Aspects; Quality of Service (QoS) Concept and Architecture (Release 7)", 3GPP TS 23.107 V7.0.0, (Jun. 2007).

3GPP, "3$^{rd}$ Generation Partnership Project; Technical Specification Group Services and System Aspects; General Packet Radio Service (GPRS); Service Description, Stage 1 (Release 7)", 3GPP TS 22.060 V7.0.0, (Jun. 2007).

3GPP, "3$^{rd}$ Generation Partnership Project; Technical Specification Group Services and System Aspects; Quality of Service (QoS) Concept and Architecture (Release 6)", 3GPP TS 23.107 V6.4.0, (Mar. 2006).

3GPP, "3$^{rd}$ Generation Partnership Project; Technical Specification Group Services and System Aspects; General Packet Radio Service (GPRS); Service Description, Stage 1 (Release 6)", 3GPP TS 22.060 V6.0.0, (Mar. 2003).

An et al., "Reduction of Handover Latency Using MIH Services in MIPv6," International Conference on Advanced Information Networking and Applications, vol. 2, pp. 229-234 (Apr. 28, 2006).

Cho et al., "A Seamless Handover between cdma2000 and WLAN for 3G-WLAN Interworking Service Continuity," Proceedings of Advanced Industrial Conference on Telecommunications/Service Assurance with Partial and Intermittent Resources Conference/E-Learning on Telecommunications Workshop, 99. 261-266 (Jul. 17, 2005).

Gupta, "IEEE P802.21 Tutorial," IEEE 802.21 Media Independent Handover (Jul. 17, 2006).

IEEE, "Draft IEEE Standard for Local and Metropolitan Area Networks: Media Independent Handover Services", IEEE P802.21/D02.00, (Sep. 2006).

IEEE, "Draft IEEE Standard for Local and Metropolitan Area Networks: Media Independent Handover Sercies", IEEE P802.21/D03.00, (Dec. 2006).

IEEE, "IEEE Standard for Local and Metropolitan Area Networks", Part 16: Air Interface for Fixed Broadband Wireless Access Systems, IEEE Std 802.16-2004, (Oct. 1, 2004).

* cited by examiner

MEDIA INDEPENDENT HANDOVER FOR SMART PHONE ARCHITECTURE

CROSS REFERENCE TO RELATED APPLICATION

This application is a continuation in part of U.S. patent application Ser. No. 11/862,963 filed Sep. 27, 2007, now U.S. Pat. No. 7,894,400, issued Feb. 22, 2011 which claims the benefit of U.S. Provisional Application No. 60/890,273 filed Feb. 16, 2007 and U.S. Provisional Application No. 60/939,387 filed May 22, 2007, all of which are incorporated by reference as if fully set forth herein. This application further claims the benefit of U.S. Provisional Application No. 60/972,106 filed Sep. 13, 2007, which is incorporated by reference as if fully set forth herein.

TECHNICAL FIELD

The subject matter disclosed herein is related to wireless communications.

BACKGROUND

Many different types of wireless access technologies have been developed including global standards for mobile communication (GSM), universal mobile telecommunication system (UMTS), CDMA2000, IEEE 802.16 wireless broadband (WiBro), WiFi and WiMAX, and IEEE 802.11 wireless local area network (WLAN). Each of these systems have been developed and tailored to provide specific applications.

With the pervasive adoption of wireless communication networks in enterprise, residential and public domains, continuous connectivity can be supported as the users of such networks move from one network to the other. With the emerging "always-on" life style, wireless transmit/receive units (WTRUs), (i.e., mobile stations (MS)), are required to support multiple heterogeneous networks, and multimode WTRUs that incorporate more than one of these wireless interfaces require an ability to seamlessly switch among them during communication.

IEEE 802.21 media independent handover (MIH) has been developed to enable a seamless handover based on measurements and triggers supplied from link layers. IEEE 802.21 defines media independent event service (ES), command service (CS) and information service (1S). IEEE 802.21 also defines media dependant/independent service access points (SAPs) and associated primitives for each specific access technology.

IEEE 802.21 MIH event and information service (EIS) requires MAC or physical layer-based event notification for link status updates between a WTRU and a MIH point of service (PoS). The MIH EIS events include link up, link down, link parameters change, link going down, service data unit (SDU) transmission status, link event rollback, pre trigger (L2 handoff imminent), and the like. Currently, link layer extensions required to support MIH EIS are under consideration for various technologies.

The key functionality provided by media independent handover is communication among the various wireless layers including an Internet protocol (IP) layer. The required messages are relayed by a MIH entity that is located in the protocol stack between the layer 2 and layer 3. The MIH entity may communicate with various IP protocol layers including a session initiation protocol (SIP) for signaling and a mobile IP layer for mobility management.

When a session is handed off from one access point to another using the same technology, the handover can usually be performed within that wireless technology itself without involving the MIH entity. For instance, a voice over IP (VoIP) call from a WiBro handset to a WiBro access point can be handed over to another WiBro access point within the same network using the same WiBro standard. However, to perform a handover from a WiBro access point to a UMTS network, the media independent handover would be required, since the two access points cannot communicate with each other at the link layer, and are in general on different IP subnets.

Accordingly, it would be desirable to provide a method and apparatus for performing handover between an IEEE 802.16 WiBro network and a UMTS network.

MIH clients may be implemented for personal computers (PCs) that interface with the PC operating system (OS) via the OS's application programming interface (API) and a removable WiBro/WCDMA device (such as, a universal serial bus (USB) dongle). Such clients rely on a dedicated COM port for communications with the WiBro/WCDMA interface.

WTRUs, such as smart phones or any other mobile device capable of processing more than one application simultaneously, may incorporate an identifiable OS with a well known API. Such WTRUs typically include an application processor configured to run the OS and other applications (such as a browser), a WCDMA Modem Processor, other radio modems (such as WiBro and WiFi), and other peripherals (such as a key pad and camera). The OS allows communication between these components through the API.

Accordingly, it would be desirable to provide a method and apparatus for performing media independent handover between an IEEE 802.16 WiBro network and an UMTS network on a smart phone. It would also be desirable for the method and apparatus to be configured to take advantage of existing APIs.

SUMMARY

A method and apparatus for performing handover between two different network protocols using IEEE 802.21 MIH functions are disclosed. A WTRU may include two or more modem processors, each configured to communicate in a different network. A WTRU may also include a MIH client, an operating system, various high level applications, such as a user interface, and various communications protocol components, each configured to run on an application processor. The operating system may provide access to an application programming interface (API) to provide the MIH client with mechanisms to receive information about the communications links, control the modems for inter-technology handover, discover a MIH server and IP multimedia system (IMS) network nodes through a dynamic host configuration protocol (DHCP) or through a domain name system (DNS), trigger mobile IP to perform IP handover, and send or receive MIH messages over a transport protocol, such as user datagram protocol (UDP). The OS may also provide access to each modem via COM port interfaces.

If link has been successfully established using a first modem, the MIH client may start a MIH session. When the first modem indicates that a connection is going to be terminated (or otherwise torn down), the MIH client may activate a second modem for handover. If the first modem indicates that a link parameter has crossed a threshold, the MIH client may send signal measurements to a MIH server. After receiving a MIH switch request, the MIH client may initiate handover to a second network. The MIH client may map QoS parameters from the first network to the second network and specify a QoS profile to be requested from the second network. Alternatively, the MIH client may request a network subscribed QoS profile during PDP context activation.

BRIEF DESCRIPTION OF THE DRAWINGS

A more detailed understanding of the invention may be had from the following description of example embodiments, given by way of example and to be understood in conjunction with the accompanying drawings wherein.

DETAILED DESCRIPTION

When referred to hereafter, the terminology "WTRU" includes but is not limited to a user equipment (UE), a mobile station, a fixed or mobile subscriber unit, a pager, a cellular telephone, a personal digital assistant (PDA), a computer, a smart phone, or any other type of user device capable of operating in a wireless environment. When referred to hereafter, the terminology "base station" includes but is not limited to a Node-B, a site controller, an access point (AP), or any other type of interfacing device capable of operating in a wireless environment.

The following description, purely for purposes of example, will be explained with reference to WiBro and WCDMA. However, it should be noted that the embodiments are not limited to WiBro-WCDMA handover and may be applied to handover between any two wireless access networks including IEEE 802.16 networks. Furthermore, although it is recognized that UMTS is a broader term than WCDMA, it is noted that WCDMA and UMTS may be used interchangeably herein.

Figure 1A:
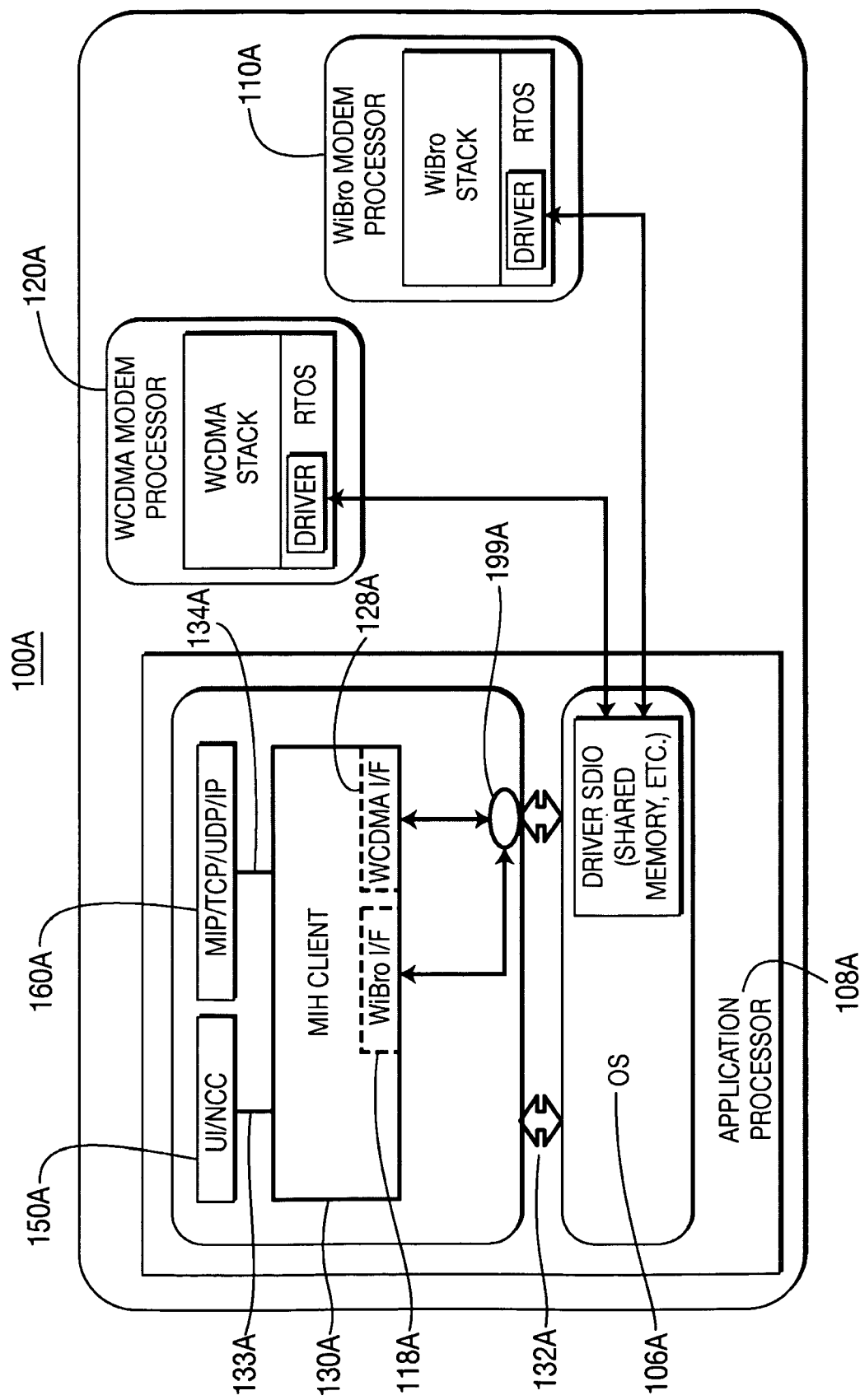
FIG. 1A is a block diagram of an example WTRU for performing a media independent handover from a WiBro network to a WCDMA network.

FIG. 1A shows an example block diagram of a WTRU 100A including a MIH client 130A for performing a media independent handover from a WiBro network to a WCDMA network in conjunction with existing APIs (for example, an OS 106A API, a mobile internet protocol (MIP) API, or Network Control Center (NCC) API). The WTRU 100A includes an application processor 108A, a WCDMA Modem Processor 110A, and a WiBro Modem Processor 120A. The application processor 108A is configured to run an OS 106A, high level applications 150A (such as a user interface (UI) or NCC), network control components 160A (such as MIP, transmission control protocol (TCP), user datagram protocol (UDP), internet protocol (IP)), and the MIH client 130A. The MIH client 130A may include a WiBro interface 118A, a WCDMA interface 128A, an operating system (OS) interface 132A, an application interface 133A, and a control protocol interface 134A. The MIH client 130A may also include one or more other components that are not illustrated in FIG. 1A for purposes of clarity. The WiBro interface 118A may be implemented, for example, on a secure digital input/output (SDIO) interface. The WCDMA interface 128A may be implemented, for example, in shared memory or on a SDIO interface.

In an embodiment, a method for implementing software interfaces between the MIH client 130A, the OS 106A, the WiBro Modem Processor 110A, and the WCDMA Modem Processor 120A using the OS's API, and between the MIH client 130A, high level applications 150A, and network control components 160A using the MIH client's interfaces and other existing APIs is provided. The MIH client 130A may be adapted to place system calls (such as, instantiation and utilization of timers, memory management, tracing, socket management, and thread management) to the OS 106A via the OS's API (for example, the Win32 API on the Windows Mobile OS) The API exposes an interface for communicating with a WCDMA Modem Processor 120A, and an interface for communicating with a WiBro Modem 110A. The WiBro interface 118A may place system calls to the WiBro Modem Processor 110A utilizing the interfaces exposed by the OS's API. Similarly, the WCDMA interface 128A may place system calls to the WCDMA Modem Processor 120A utilizing the interfaces exposed by the OS's API. The application interface 133A is adapted to communicate with a user interface (UI), a Network Control Centre (NCC), or both. The control protocol interface 134A is adapted to communicate with a Mobile IP client, a TCP client, an UPD client, an IP client, or a combination thereof. The OS 106A may also expose a transparent interface (such as a COM port) to allow the MIH client 130A to communicate directly with the WiBro Modem Processor 110A, the WDCMA Modem Processor 120A, or both. The MIH client 130A may also include a porting layer (not shown) to allow adaptation to other APIs.

Figure 1B:
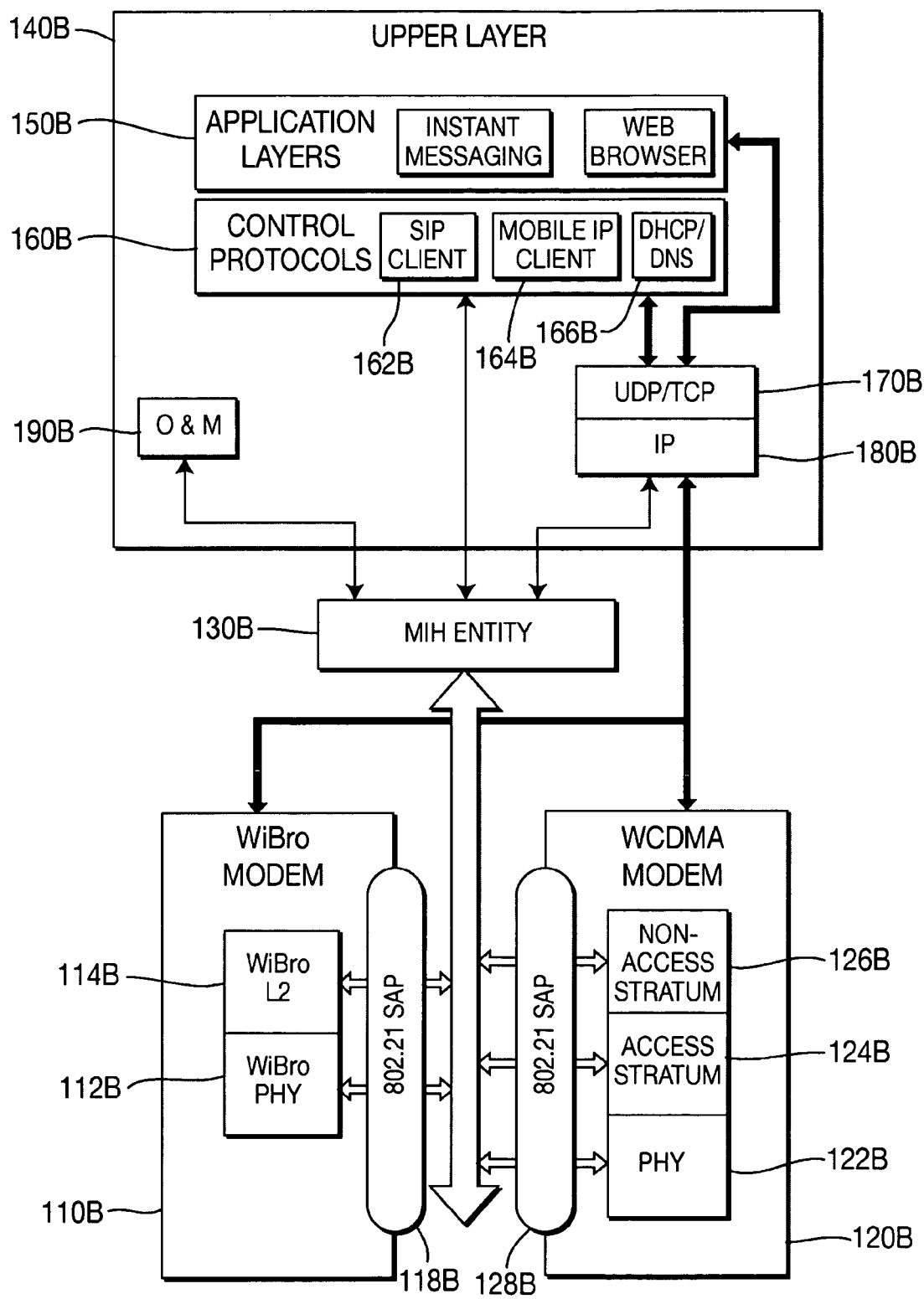
FIG. 1B is a block diagram of an example WTRU for performing a media independent handover from a WiBro network to a WCDMA network

FIG. 1B is a block diagram of an example WTRU 100B for performing a media independent handover from a WiBro network to a WCDMA network. The WTRU 100B may include an IEEE 802.16 (e.g., WiBro, WiMAX or the like) modem 110B, a WDCMA modem 120B, a MIH entity (MIH middleware) 130B, and an upper layer 140B. The WTRU 100B may also include one or more other components that are not illustrated in FIG. 1B for purposes of clarity. The upper layer 140B may include an application layer 150B, (such as instant message, web browsing, or the like), a control protocol layer 160B, (such as session initiation protocol (SIP), mobile Internet protocol (IP), dynamic host configuration protocol (DHCP), domain name system (DNS), or the like), a transport layer 170B, (such as a user datagram protocol (UDP) layer, a transmission control protocol (TCP) layer, a stream control transmission protocol (SCTP), a datagram congestion control protocol (DCCP), or the like), an IP layer 180B, and an operating and maintenance (O&M) entity 190B, for example. The WiBro modem may include a WiBro physical layer 112B and a WiBro L2 114B. The WCDMA modem may include a physical layer 122, an access stratum (AS) layer 124B, and a non-access stratum (NAS) layer 126B. The commands and information from the MIH entity 130B to the WiBro modem 110B and the WCDMA modem 120B, or vice versa, may be communicated via 802.21 service access points (SAPs) 118B, 128B that perform mapping functions for the WiBro modem 110B and the WCDMA modem 120B.

In an example embodiment, a method for implementing software interfaces between the MIH entity 130B and other entities in the WTRU 100B is provided. The software interfaces provide the MIH entity 130B with mechanisms to receive information about the WiBro and WCDMA links, control the WiBro modem 110B, the WCDMA modem 120B and other components of the WTRU 100B for inter-technology handover, discover a MIH server and IP multimedia system (IMS) network nodes through DHCP or domain name system (DNS), trigger mobile IP to perform IP handover, send or receive MIH messages over TCP/UDP, and allow the O&M entity 190B to be able to control the MIH entity 130B.

In another embodiment, client application programming interfaces (APIs) for WiBro-WCDMA mobility are defined. The APIs include lower layer client APIs and upper layer client APIs. Table 1 shows lower layer client APIs between the WiBro modem 110B and the MIH entity 130B, and Table 2 shows lower layer client APIs between the WCDMA modem 120B and the MIH entity 130B.

TABLE 1

| API ID | WiBro Definition of API (IEEE P802.16g/D6, November 2006) | 802.21 Definition of API (IEEE P802.21 ™/D02.00, September 2006) | 802.21 Service Type |
|---|---|---|---|
| 1.1 MIH middleware → WiBro | Set thresholds for certain WiBro link parameters which when crossed (go Below) will generate measurement reports. | Link_Configure_Thresholds.request Configure thresholds for Link Parameter Report indication. | Command |
| 1.2 WiBro → MIH middleware | Sent in response to request for configuring link parameters and specifies result of configuration process. | Link_Configure_Thresholds.confirm Sent in response to Link Configure Thresholds request and specifies the result of the configuration process. | (Response to) Command |
| 1.3 WiBro → MIH middleware | Indicate that current WiBro cell is the last cell and report the corresponding Cell ID (for end of WiBro coverage). | Link_Going_Down Layer 2 connection is expected (predicted) to go down in a certain time interval. | Event |
| 1.4 WiBro → MIH middleware | Take periodic measurements of WiBro link to indicate that parameters have crossed (gone Below) certain thresholds. | Link_Parameter_Report.indication Indicates (periodically) that link parameters have crossed (gone Below) certain thresholds. | Event |
| 1.5 MIH middleware → WiBro | M-MTM-REQ Used to request status change of the WiBro stack e.g. Power On (Off). | Link_Action.request Orders link layer connection to come up (or shut down, etc) including QoS information. | Command |
| 1.6 WiBro → MIH middleware | M-MTM-RSP Generated in response to M-MTM-REQ & indicates status of operation | Link_Action.confirm Generated in response to Link_Switch.request & indicates status of operation | (Response to) Command |
| 1.7 MIH middleware → WiBro | Request QoS parameters for target (running) application. | Link_Get_Parameters.request Request QoS parameters for target (running) application. | Command |
| 1.8 WiBro → MIH middleware | Respond with target QoS parameters. | Link_Get_Parameters.confirm Respond with target QoS parameters. | (Response to) Command |
| 1.9 WiBro → MIH middleware | C-NEM-RSP Indicate that current WiBro chip has detected coverage and formed an association with a base station. | Link_Up.indication Layer 2 connection is established on the specified link interface and all layer 2 activities in establishing the link connectivity are completed. | Event |
| 1.10 WiBro → MIH middleware | C-NEM-RSP Indicate that current WiBro chip has lost connectivity with the base station it was previously associated with and no further communication can occur on WiBro. | Link_Down.indication Layer 2 connection is broken on the specified link and no more packets may be sent on the specified link. | Event |
| 1.11 WiBro → MIH middleware | Indicate that the WTRU is moving back into WiBro coverage from a border cell for which an indication had been provided previously. | Link_Event_Rollback.indication The link is no longer expected to go down in the specified time interval (used in conjunction with Link Going Down indication). | Event |
| 1.12 WiBro → MIH middleware | Indicate that the mobile node is in the coverage area and may be listen to a beacon, or that the mobile node may have received a response to a probe. | Link_Detected.indication Indicates that a new type of link has been detected for use. | Event |

TABLE 2

| API ID | Description | WCDMA Definition of API (using AT Commands) AT Command Set 3GPP TS 27.007 V5.6.0 (2005-03) | 802.21 Definition of API (IEEE P802.21 ™/D02.00, September 2006) | 802.21 Service Type |
|---|---|---|---|---|
| 2.1 MIH middleware → UMTS | Request on-demand reports of UMTS signal quality measurements. | Measure signal quality - AT+CSQ | Link_Get_Parameters.request Request values for specific link parameters e.g. RSSI, SNR, BER etc. | Command |
| 2.2 UMTS → MIH middleware | Report UMTS signal strength measurements in response to requests. | Report signal measurements - <rssi, ber> | Link_Get_Parameters.confirm Returns the values of requested signal parameters. | (Response to) Command |
| 2.3 MIH middleware → UMTS | Power on and go to IDLE mode. - - - OR - - - Go to Connected Mode and activate PDP Context (RAB Establishment). - - - OR- - - Deactivate PDP Context, and RAB release. | Start up the terminal, disable TX, camp on network but do not register to it - AT+CFUN - - - OR - - - Create new PDP Context - AT+CGDCONT Specify UMTS QoS Profile - AT+CGEQREQ PS attach - AT+CGATT Network registration status - AT+CGREG? Activate PDP context - AT+CGACT Request current setting for PDP Context- AT+CGDCONT? Enter data state - AT+CGDATA - - - OR - - - Deactivate PDP Context - AT+CGACT Request current setting for PDP Context - AT+CGDCONT? PS detach - AT+CGATT Network registration status - AT+CGREG? | Link_Action.request Orders link layer connection to come up (or shut down, etc) including QoS information. | Command |
| 2.4 UMTS → MIH middleware | Indicate status of request to come up in IDLE mode. - - - OR - - - Indicates status to go to Connected Mode, and activate PDP Context and RAB Establishment. - - - OR - - - Indicates status to deactivate PDP Context and RAB release | OK or CME ERROR (for AT CFUN) - - - OR - - - OK or ERROR (for AT+CGDCONT) OK or ERROR (for AT+CGEQREQ) OK or ERROR (for AT+CGATT) Registration status code (for AT+CGREG?) OK or ERROR (for AT+CGACT) Current setting for each defined context (for AT+CGDCONT?) CONNECT or ERROR (for AT+CGDATA) - - - OR - - - OK or ERROR (for AT+CGACT) Current setting for each defined context (for AT+CGDCONT?) OK or ERROR (for AT+CGATT) Registration status code (for AT+CGREG?) | Link_Action.confirm Generated in response to Link_Switch.request & indicates status of operation. | (Response to) Command |

AT commands may be used to communicate between the WCDMA modem 120B and the MIH entity 130B to perform functions, (e.g., to create a PDP context). The format of AT commands includes a prefix, a body and a termination, which will be described in detail hereinafter.

Table 3 shows upper layer client APIs between the MIH entity 130B and the mobile IP layer 164B. Table 4 shows upper layer client APIs between the MIH entity 130B and the SIP client 162B. Table 5 shows upper layer client APIs between the MIH entity 130B and the UDP/IP layer 170B/180B. Table 6 shows upper layer client APIs between the MIH entity 130B and the DHCP layer 166B. Table 7 shows upper layer client APIs between the MIH entity 130B and the O&M entity 190B.

TABLE 3

| API ID | API Description | Purpose |
| --- | --- | --- |
| 3.1 MIH middleware → Mobile IP | Discover Mobile IP (MIP) Foreign Agent (FA). | Indicate that Mobile Node (MN) has moved into a new (foreign) network that supports Mobile IP. |
| 3.2 Mobile IP → MIH middleware | Confirm discovery of FA. | Returns the result of an attempt to discover the FA (also implicitly indicates if an IP address has been obtained or not). |
| 3.3 MIH middleware → Mobile IP | Register new network attachment with Home Agent (HA) via FA. | Initiate Mobile IP binding update in HA. HA maps MN's "permanent" IP address assigned by the HA with it's "temporary" care-of address (COA) assigned by the FA. Registration control messages are sent via UDP to well known port. |
| | More generally, perform a Mobile IP registration and any other prerequisite steps. | Indicate that MN has moved into a different (foreign) network that supports Mobile IP and requests the Mobile IP Client to start performing steps involved in a Mobile IP registration (such as sending a Router Solicitation, receiving Agent Advertisement and sending a Registration Request message to the HA). |
| 3.4 Mobile IP → MIH middleware | Confirm binding update completion. | Return the result of an attempt to update the HA about the client's current location (IP address currently used). |
| | More generally, provide feedback about the success or failure of the registration attempt. | Returns the result of the Mobile IP Registration procedure. Result may include new IP obtained or error code to provide information about why Registration could not be done with success. |
| 3.5 MIH middleware → Mobile IP | Request information about number of IP addresses in use and the Home Addresses corresponding to the active IPs. | Request information about Mobile IP's current handling of IP addresses. |
| 3.6 Mobile IP → MIH middleware | Provide number of IP addresses in use and the corresponding Home Addresses as requested in 3.5. | Provide information on how many IP addresses are in use so that equivalent number of PDP contexts can be activated and the Home Address can be used to figure out the default QoS class requirement. |
| 3.7 MIH middleware → Mobile IP | Request the HA IP address. | Request the HA IP address since it's required when registering with the MIH Server. |
| 3.8 Mobile IP → MIH middleware | Provide the HA IP address. | Provide the HA IP address as requested or an error code specifying why the address cannot be returned. |

TABLE 4

| API ID | API Description | Purpose |
| --- | --- | --- |
| 4.1 MIH middleware → DHCP | Discover the IP address of the proxy call state control function (P-CSCF). | Discovers the P-CSCF to perform registration with the IMS Network (see also DHCP APIs). |
| 4.2 DHCP → MIH middleware | Confirm discovery of P-CSCF. | Returns the result of an attempt to discover the IP address of the P-CSCF. |
| 4.3 MIH middleware → IMS/SIP | Register with the IMS Network. | Allows the client device to start executing IMS services. |
| 4.4 IMS/SIP → MIH middleware | Confirm IMS registration. | Returns the result of an attempt to register to the IMS network. |

TABLE 5

| API ID | API Description | Purpose |
|---|---|---|
| 5.1 MIH middleware → UDP/IP | Send MIH message to 802.21 MIH Server. | Send MIH messages from the client (Middleware) to the 802.21 MIH server. |
| 5.2 UDP/IP → MIH middleware | Confirm MIH message sending. | Inform the Middleware of the status of the requested message dispatch. |
| 5.3 MIH middleware → UDP/IP | Request UDP/IP to receive a MIH message. | Receives a MIH Message by UDP. |
| 5.4 UDP/IP → MIH middleware | Receive MIH message from 802.21 MIH Server. | Forwards remote MIH messages (to the Middleware in the client) that are received from the 802.21 MIH server. |

TABLE 6

| API ID | API Description | Purpose |
|---|---|---|
| 6.1 MIH middleware → DHCP | Discover the IP address of a network node. | Triggers discovery of the IP address of network nodes such as the 802.21 MIH Server or the P-CSCF. |
| 6.2 DHCP → MIH middleware | Confirm discovery of network node. | Returns the result of an attempt to discover of a particular network node. |

TABLE 7

| API ID | API Description | Purpose |
|---|---|---|
| 7.1 O&M Interface → MIH middleware | Start MIH Middleware. | Puts the MIH Middleware into an active mode. |
| 7.2 MIH middleware → O&M Interface | Confirm start of MIH Middleware. | Returns the result of an attempt to start the MIH Middleware. |
| 7.3 O&M Interface → MIH middleware | Stop MIH Middleware. | Deactivates the MIH Middleware. |
| 7.4 MIH middleware → O&M Interface | Confirm stop of MIH Middleware. | Returns the result of an attempt to deactivate the MIH Middleware. |
| 7.5 O&M Interface → MIH middleware | Retrieve MIH Middleware parameters (i.e. states, variables, link conditions, etc). | Retrieves current MIH Middleware conditions for testing/debugging purposes. |
| 7.6 MIH middleware → O&M Interface | Provide MIH Middleware conditions, parameter values, etc. | Returns the value of specific (requested) MIH Middleware conditions, parameters, etc. |
| 7.7 MIH middleware → O&M Interface | Informs about an inter-technology handover event completion. Alternatively, informs O&M O&M about any link layer or MIH-related events. | Used to report handover completions & if applicable used to start/stop other procedures that are affected by handovers. Alternatively, used to report handover completions, link layer failures, detections and all indications related to MIH functionalities and link-layer management functionalities. |
| 7.8 O&M Interface → MIH middleware | Check if WCDMA modem in command or data mode. | Used to query the mode i.e. command or data in which the WCDMA modem in functioning. |
| 7.9 MIH middleware → O&M Interface | Provide WCDMA modem mode. | Returns mode of the WCDMA modem i.e. command or data mode. |
| 7.10 O&M Interface → MIH middleware | Set configuration parameters request. | Used to dynamically change the configuration of certain parameters. |
| 7.11 MIH middleware → O&M Interface | Confirm the configuration request. | Returns the status of the set configuration request. |
| 7.12 MIH middleware → O&M Interface | Request information concerning the requested QoS. | Used to query the O&M about the requested QoS parameters. |
| 7.13 O&M Interface → MIH middleware | Response to the QoS query. | Returns the requested QoS parameters. |

Figure 2A:
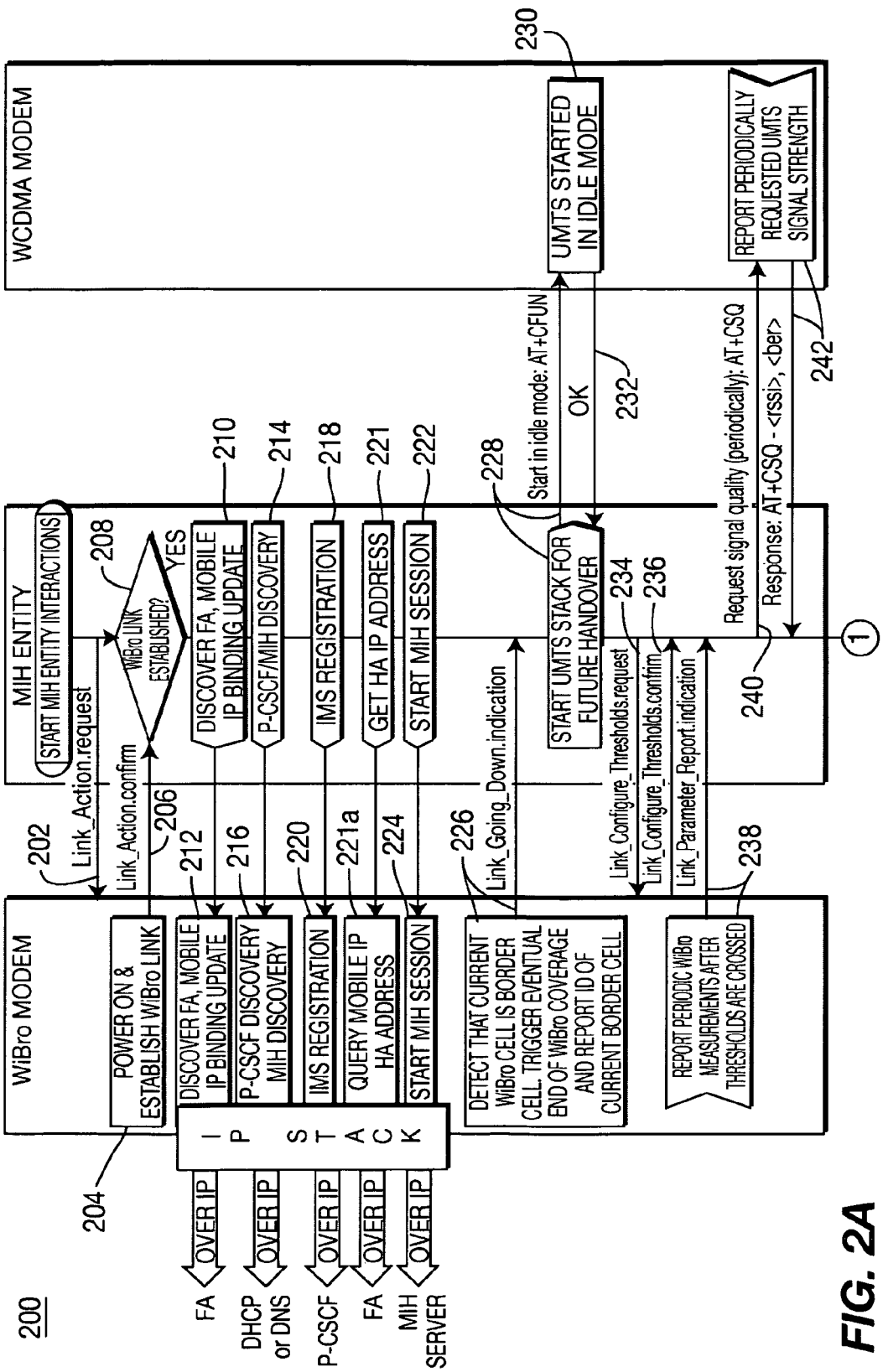
FIGS. 2A and 2B are flow diagrams of an example process for performing a media independent handover from a WiBro network to a WCDMA network.
Figure 2B:
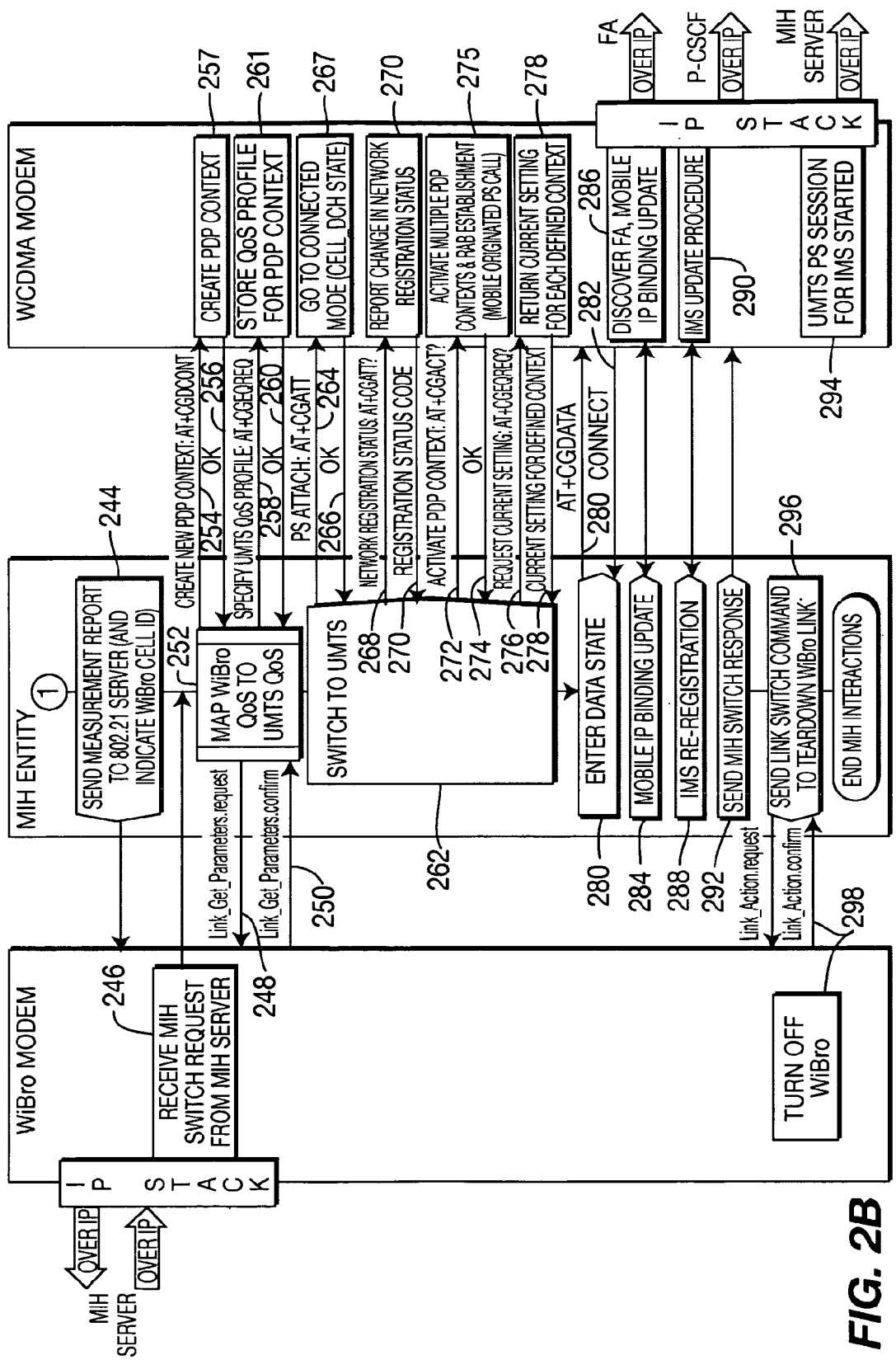

FIGS. 2A and 2B are flow diagrams of an example process 200 for performing a media independent handover from a WiBro network to a UMTS network. Upon start of the MIH interactions, the MIH entity activates the WiBro modem via a Link_Action.request API (step 202). The WiBro modem is activated and the WiBro modem attempts to establish a WiBro link (step 204). The status of the activation and WiBro link establishment is indicated to the MIH entity via a Link_Action.confirm API (step 206). If it is determined that a WiBro link has not been established, a process 400 will be performed which will be explained in detail with reference to FIG. 4 below.

If it is determined that a WiBro link has been successfully established at step 208, the MIH entity requests a mobile IP client 164B to perform discovery of a foreign agent and mobile IP binding update (step 210). A FA discovery is performed and mobile IP binding update is performed with the discovered FA via an IP stack over the WiBro link (step 212). Proxy call state control function (P-CSCF) and MIH discovery is performed over IP stack via DHCP or DNS (step 214). A P-CSCF and a MIH server is discovered with a DHCP or DNS server via an IP stack (step 216). The MIH entity requests the SIP client to perform IP multimedia subsystem (IMS) registration (step 218). IMS registration is performed with a P-CSCF via an IP stack (step 220). The HA IP address is queried via the FA (steps 221, 221*a*). The MIH entity then starts a MIH session (step 222). The start of MIH session is communicated with the MIH server via an IP stack (step 224). When it is detected that the current WiBro cell is a border cell, (i.e., the WiBro link condition is being lowered), the eventual end of WiBro coverage is triggered and the identity (ID) of the current WiBro border cell is reported to the MIH entity via a Link_Going_Down.indication API (step 226). The MIH entity then activates the WCDMA modem by sending an AT+CFUN command to the WCDMA modem (step 228). The WCDMA modem is activated and OK is signaled (step 230, 232).

Figure 7:
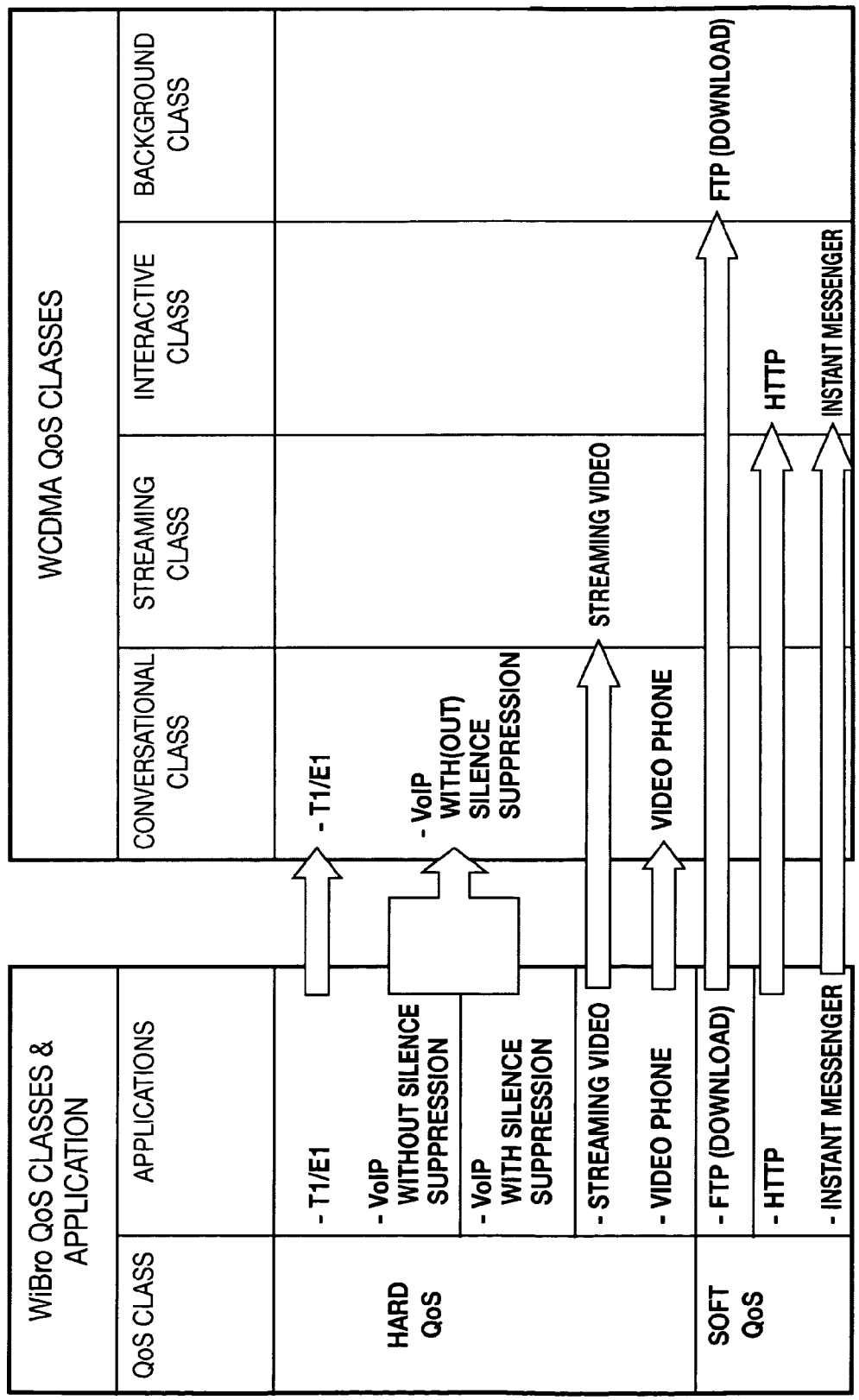
FIG. 7 shows an example mapping of the WiBro QoS parameters to WCDMA QoS parameters.

The MIH entity sets thresholds, via a Link_Configure_Thresholds.request API to the WiBro modem (step 234), for certain WiBro link parameters which when crossed, trigger generation of a measurement report. The WiBro modem sends a confirmation in response to the request for configuring the link parameters and specifies the result of configuration to the MIH entity via a Link_Configure_Thresholds.confirm API (step 236). The WiBro modem reports measurement results to the MIH entity periodically after thresholds are crossed via a Link_Parameter_Report.indication API (step 238). The MIH entity requests (periodic) signal quality measurement from the WCDMA modem by sending an AT+CSQ command (step 240). The WCDMA modem responds to periodically requested signal quality measurements from the MIH entity (step 242). The MIH entity sends the signal quality measurements and the WiBro cell ID to the MIH server via an IP stack (step 244). The MIH entity receives a MIH switch request from the MIH server (step 246). The MIH entity may request QoS parameters for the currently running application from the WiBro modem via a Link_Get_Parameters.request API for mapping WiBro QoS parameters to WCDMA QoS parameters (step 248). The WiBro modem responds with the requested QoS parameters via a Link_Get_Parameters.confirm API (step 250). The MIH entity then maps the WiBro QoS parameters to UMTS QoS parameters (step 252). The mapped UMTS QoS profile is requested to the UMTS network during PDP context activation. WiBro QoS definition and WCDMA QoS definition are shown in Tables 8 and 9, respectively. An example mapping of the WiBro QoS parameters to WCDMA QoS parameters are shown in FIG. 7 and Table 10.

TABLE 8

| QoS Class | Applications | Data Delivery Services | QoS Parameters | Scheduling Services | Packet Scheduling Discipline/Algorithm |
|---|---|---|---|---|---|
| Hard QoS | T1/E1, VoIP without silence Suppression | UGS | Tolerated jitter SDU size Min. reserved traffic rate Max. latency Request/Transmission policy Unsolicited grant interval | UGS | Round-robin (Periodic/fixed assignment) |
| | VoIP with silence suppression | RT-VR | Maximum latency Min. reserved traffic rate Max. sustained traffic rate | ertPS | Round-robin (Periodic/dynamic assignment) |
| | Streaming Video, Video Phone | RT-VR | Traffic priority Request/Transmission policy Unsolicited polling Interval | rtPS | Round-robin (Dynamic assignment with delay constraint) |
| Soft QoS | FTP (Download) | NRT-VR | Min. reserved traffic rate Max. sustained traffic rate Traffic priority Request/Transmission policy | nrtPS | Max C/I PF Scheduling |
| | HTTP, Instant Messenger | BE | Max. sustained traffic rate Traffic priority Request/Transmission policy | BE | |

TABLE 9

| Traffic class | Conversational class | Streaming class | Interactive class | Background class |
|---|---|---|---|---|
| Maximum bitrate (kbps) | <2 048 (1) (2) | <2 048 (1) (2) | <2 048 - overhead (2) (3) | <2 048 - overhead (2) (3) |

TABLE 9-continued

| Traffic class | Conversational class | Streaming class | Interactive class | Background class |
|---|---|---|---|---|
| Delivery order | Yes/No | Yes/No | Yes/No | Yes/No |
| Maximum SDU size (octets) | <=1 500 or 1 502 (4) | <=1 500 or 1 502 (4) | <=1 500 or 1 502 (4) | <=1 500 or 1 502 (4) |
| SDU format information | (5) | (5) | | |
| Delivery of erroneous SDUs | Yes/No/— (6) | Yes/No/— (6) | Yes/No/— (6) | Yes/No/— (6) |
| Residual BER | $5 * 10^{-2}, 10^{-2}, 5 * 10^{-3}, 10^{-3}, 10^{-4}, 10^{-5}, 10^{-6}$ | $5 * 10^{-2}, 10^{-2}, 5 * 10^{-3}, 10^{-3}, 10^{-4}, 10^{-5}, 10^{-6}$ | $4 * 10^{-3}, 10^{-5}, 6 * 10^{-8}$ (7) | $4 * 10^{-3}, 10^{-5}, 6 * 10^{-8}$ (7) |
| SDU error ratio | $10^{-2}, 7 * 10^{-3}, 10^{-3}, 10^{-4}, 10^{-5}$ | $10^{-1}, 10^{-2}, 7 * 10^{-3}, 10^{-3}, 10^{-4}, 10^{-5}$ | $10^{-3}, 10^{-4}, 10^{-6}$ | $10^{-3}, 10^{-4}, 10^{-6}$ |
| Transfer delay (ms) | 100 - maximum value | 250 - maximum value | | |
| Guaranteed bit rate (kbps) | <2 048 (1) (2) | <2 048 (1) (2) | | |
| Traffic handling priority | | | 1, 2, 3 | |
| Allocation/ Retention priority | 1, 2, 3 | 1, 2, 3 | 1, 2, 3 | 1, 2, 3 |

TABLE 10

| WiBro QoS Parameters | WCDMA QoS Parameters |
|---|---|
| UGS, ertPS | Conversational Class |
| rtPS | Streaming Class |
| nrtPS | Background Class |
| BE | Interactive Class |
| Maximum sustained traffic rate (bps) | Maximum bit rate (kbps) |
| Maximum latency (ms) | Transfer delay (ms) |
| Minimum reserved traffic rate (bps) | Guaranteed bit rate (kbps) |
| Traffic priority (0-7) | Traffic handling priority (1, 2, 3, . . . ) |

Alternatively, the MIH entity may obtain the "subscribed QoS profile" from the UMTS network instead of mapping the previously granted WiBro QoS to WCDMA QoS. In this procedure, the previous WiBro granted QoS is ignored, and the MIH entity indicates to use network subscribed (assigned) QoS in the PDP context activation message to the UMTS network. The MIH entity then accepts the QoS profile sent by the UMTS network.

The MIH entity requests a new packet data protocol (PDP) context creation by sending an AT+CGDCONT command to the WCDMA modem (step 254). OK is signalled in response and a new PDP context is created (steps 256, 257). The MIH entity specifies the UMTS QoS profile by sending an AT+CGEQREQ command to the WCDMA modem (step 258). OK is signalled in response and the QoS profile is stored for PDP context (steps 260, 261).

The MIH entity initiates a procedure to switch to UMTS (step 262). The MIH entity requests performing attachment with the UMTS network by sending an AT+CGATT command to the WCDMA modem (step 264). OK is signalled in response and a radio resource control (RRC) connection setup procedure is performed with a radio network controller (RNC) and an attachment procedure is performed with a serving general packet radio services (GPRS) support node (SGSN) (steps 266, 267). The WCDMA modem goes to a connected mode. The MIH entity requests a network registration status by sending an AT+CGATT? command to the WCDMA modem (step 268). The WCDMA modem reports a change in network registration status (step 270). The MIH entity requests activation of the PDP context by sending an AT+CGACT command to the WCDMA modem (step 272).

OK is signalled in response and PDP context activation and radio bearer establishment are performed with the SGSN and a gateway GPRS support node (GGSN) (steps 274, 275). During the PDP context activation, a QOS profile either generated by mapping the WiBro QoS parameters to WCDMA QoS parameters, or indicating a request for subscribed QoS profile is sent with a PDP context activation message. The MIH entity requests current setting for PDP context by sending an AT+CGEQREQ/? command to the WCDMA modem (step 276). The WCDMA modem returns a current setting for each defined PDP context to the MIH entity (step 278).

The MIH entity requests the WCDMA modem to enter a data state by sending an AT+CGDATA command (step 280). The WCDMA modem responds with a CONNECT command (step 282). The MIH entity requests the mobile IP client 164B to perform FA discovery and mobile IP binding update (step 284). FA discovery and mobile IP binding update with the discovered FA are performed via an IP stack over the WCDMA link (step 286). The MIH entity requests the SIP client 162B to perform IMS re-registration (step 288). IMS re-registration is performed with the P-CSCF over an IP stack (step 290). The MIH entity sends a MIH switch response to the MIH server over the IP stack in response to the switch request at step 240 (step 292). A UMTS session for IMS starts (step 294). The MIH entity sends a link switch command to teardown the WiBro link to the WiBro modem via a Link_Action.request API (step 296). The WiBro modem responds via a Link_Action.confirm API and the WiBro modem is turned off (step 298).

Figure 3:
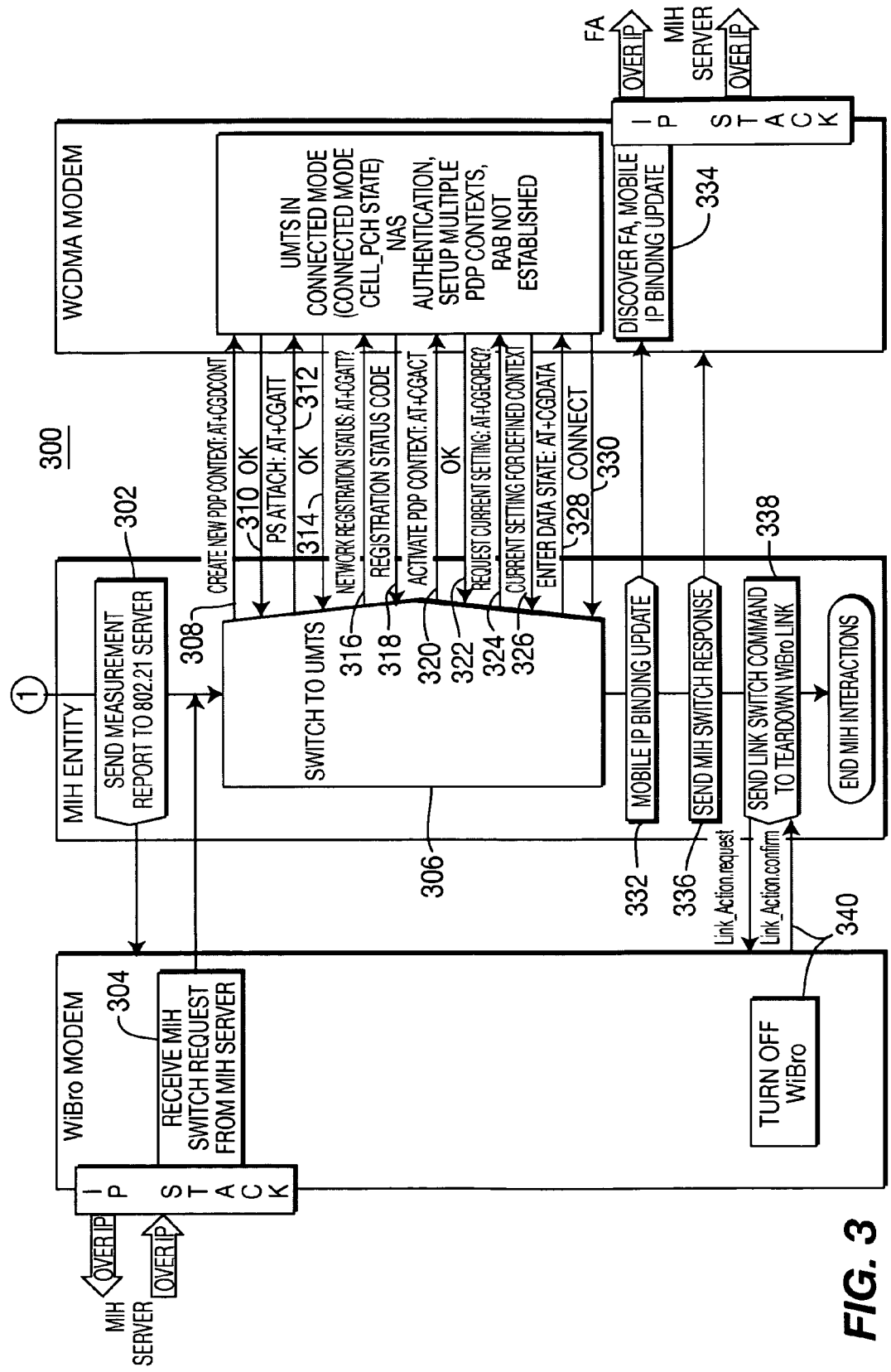
FIG. 3 shows an alternative to the example process in FIG. 2 when there is no data session on WiBro at handover.

FIG. 3 shows an alternative to the example process 200 when there is no data session on WiBro at handover. When there is no data session on going at the time of handover, after performing steps 202-242, the MIH entity sends the signal quality measurements to the MIH server via an IP stack (step 302). The MIH entity receives a MIH switch request from the MIH server (step 304).

The MIH entity initiates a procedure to switch to UMTS (step 306). The MIH entity requests a new PDP context creation by sending an AT+CGDCONT command to the WCDMA modem (step 308). OK is signalled in response and a new PDP context is created (step 310). The MIH entity requests performing attachment with the UMTS network by sending an AT+CGATT command to the WCDMA modem (step 312). OK is signalled in response and the attachment procedure is performed and the WCDMA modem goes to a connected mode (step 314). The MIH entity requests a network registration status by sending an AT+CGATT? command to the WCDMA modem (step 316). The WCDMA modem reports a change in network registration status (step 318). The MIH entity request activation of the PDP context by sending an AT+CGACT command to the WCDMA modem (step 320). OK is signalled in response and PDP context activation and radio bearer establishment are performed (step 322). The MIH entity requests current setting for PDP context by sending an AT+CGEQREQ? command to the WCDMA modem (step 324). The WCDMA modem returns current setting for each defined PDP context to the MIH entity (step 326).

The MIH entity requests the WCDMA modem to enter a data state by sending an AT+CGDATA command (step 328). The WCDMA modem responds with a CONNECT command (step 330). The MIH entity requests the mobile IP client 164B to perform FA discovery and mobile IP binding update (step 332). FA discovery and mobile IP binding update with the discovered FA are performed via an IP stack (step 334). The MIH entity sends a MIH switch response to the MIH server via an IP stack (step 336). The MIH entity sends a link switch command to teardown the WiBro link to the WiBro modem via a Link_Action.request API (step 338). The WiBro modem responds via a Link_Action.confirm API and the WiBro modem is turned off (step 340).

Figure 4:
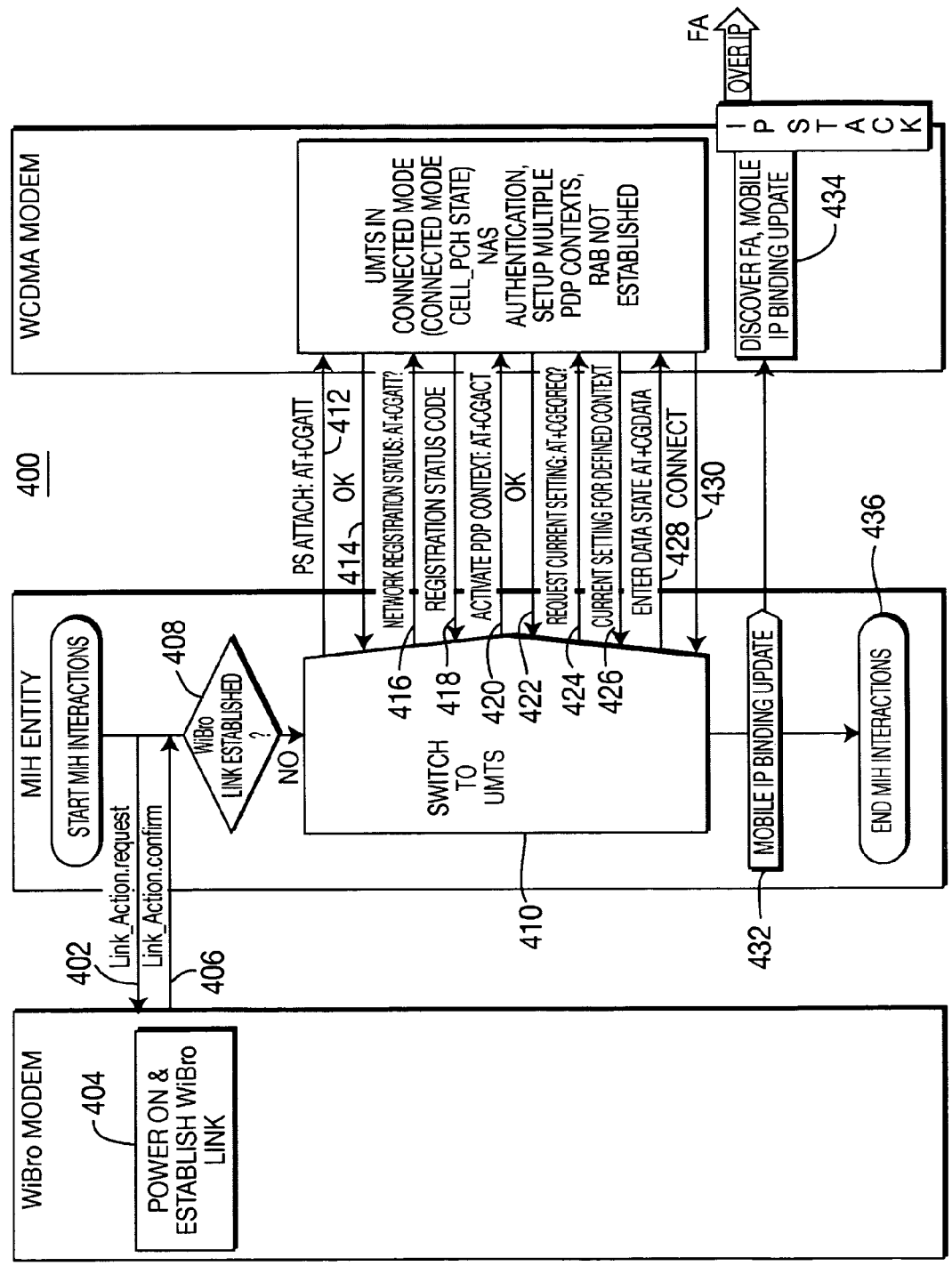
FIG. 4 is a flow diagram of an example process for performing a media independent handover when there is no WiBro coverage at start-up.

FIG. 4 is a flow diagram of an example process 400 for performing a media independent handover when there is no WiBro coverage at start-up. Upon start of the MIH interactions, the MIH entity activates the WiBro modem via a Link_Action.request API (step 402). The WiBro modem is activated and the WiBro modem attempts to establish a WiBro link (step 404). The status of the activation and WiBro link establishment is indicated to the MIH entity via a Link_Action.confirm API (step 406). If it is determined that a WiBro link has not been established at step 408, the MIH entity initiates a procedure to switch to UMTS (step 410).

The MIH entity requests performing attachment with the UMTS network by sending an AT+CGATT command to the WCDMA modem (step 412). OK is signalled in response and an attachment procedure is performed and the WCDMA modem goes to a connected mode (step 414). The MIH entity requests a network registration status by sending an AT+CGATT? command to the WCDMA modem (step 416). The WCDMA modem reports a change in network registration status (step 418). The MIH entity requests activation of the PDP context by sending an AT+CGACT command to the WCDMA modem (step 420). OK is signalled in response and PDP context activation and radio bearer establishment are performed (step 422). The MIH entity requests current setting for PDP context by sending an AT+CGEQREQ? command to the WCDMA modem (step 424). The WCDMA modem returns current setting for each defined PDP context to the MIH entity (step 426). The MIH entity requests the WCDMA modem to enter a data state by sending an AT+CGDATA command (step 428). The WCDMA modem responds with a CONNECT command (step 430). The MIH entity requests the mobile IP client 164B to perform FA discovery and mobile IP binding update (step 432). FA discovery and mobile IP binding update with the discovered FA are performed via an IP stack (step 434). The MIH interactions end (step 436).

Figure 5:
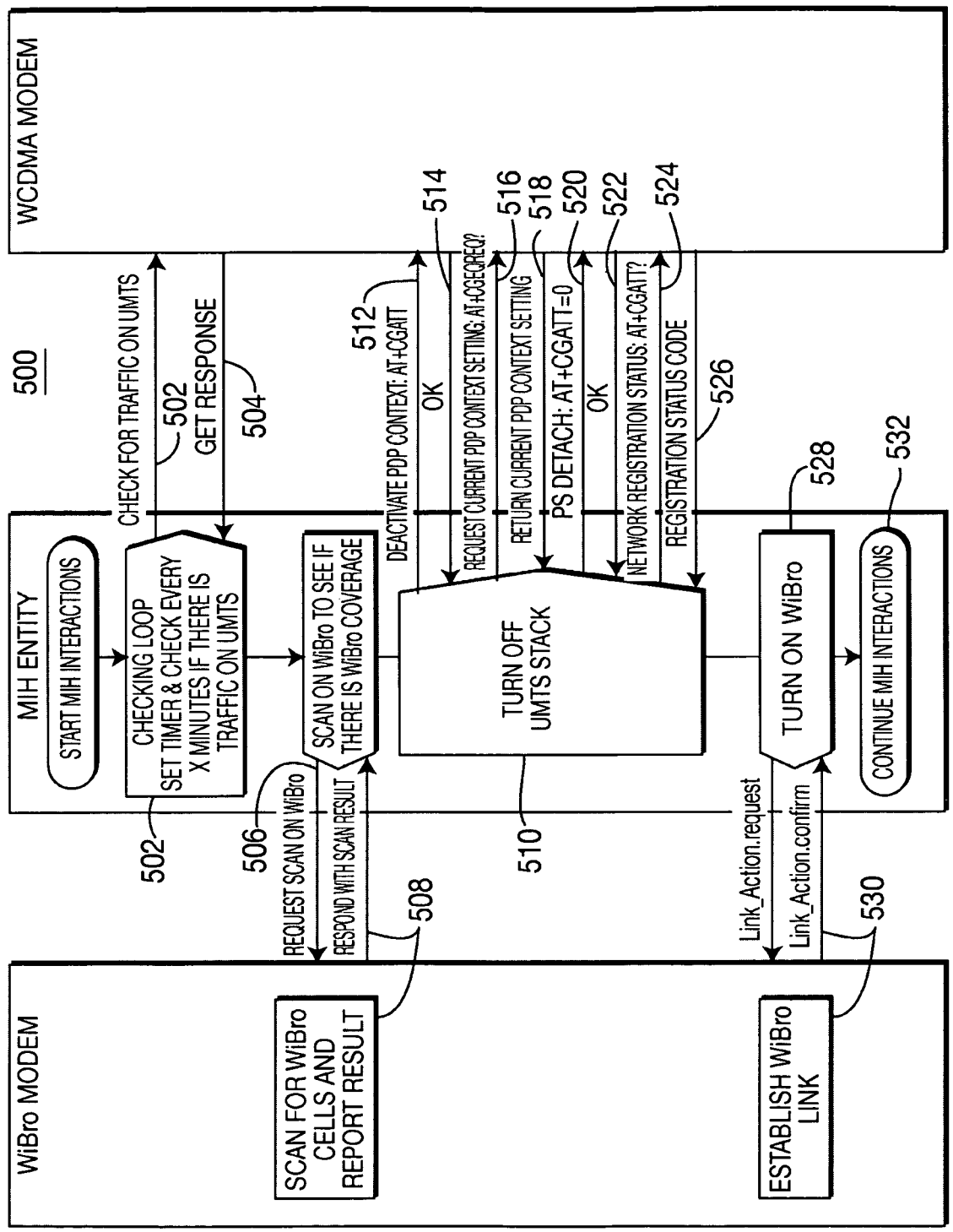
FIG. 5 is a flow diagram of an example process for performing a media independent handover from a UMTS network to a WiBro network.

FIG. 5 is a flow diagram of an example process 500 for performing a media independent handover from a UMTS network to a WiBro network. Upon start of the MIH interactions, the MIH entity sets a timer and checks periodically if there is traffic on UMTS by sending a command to the WCDMA modem (step 502). The WCDMA modems responds to the command (step 504). If it is determined that there is no traffic on WCDMA, the MIH entity requests the WiBro modem to scan on WiBro to determine whether there is WiBro coverage (step 506). The WiBro modem scans for WiBro cells and reports the scanning results to the MIH entity (step 508).

If it is indicated that there is WiBro coverage, the MIH entity initiates a procedure to turn off the WCDMA modem (step 510). The MIH entity requests deactivation of the PDP context by sending an AT+CGACT command to the WCDMA modem (step 512). OK is signalled in response and the PDP context is deactivated (step 514). The MIH entity requests a current PDP context setting by sending an AT+CGEQREQ? command to the WCDMA modem (step 516). The WCDMA modem returns a current PDP context setting to the MIH entity (step 518). The MIH entity requests network detachment by sending an AT+CGATT command set to '0' to the WCDMA modem (step 520). OK is signalled in response and a detachment procedure is performed (step 522). The MIH entity requests a network registration status by sending an AT+CGATT? command to the WCDMA modem (step 524). The WCDMA modem returns network registration status to the MIH entity (step 526). The MIH entity activates the WiBro modem via a Link_Action.request API (step 528). The WiBro modem is activated and the WiBro modem attempts to establish a WiBro link (step 530). The MIH interactions are continued.

Figure 6A:
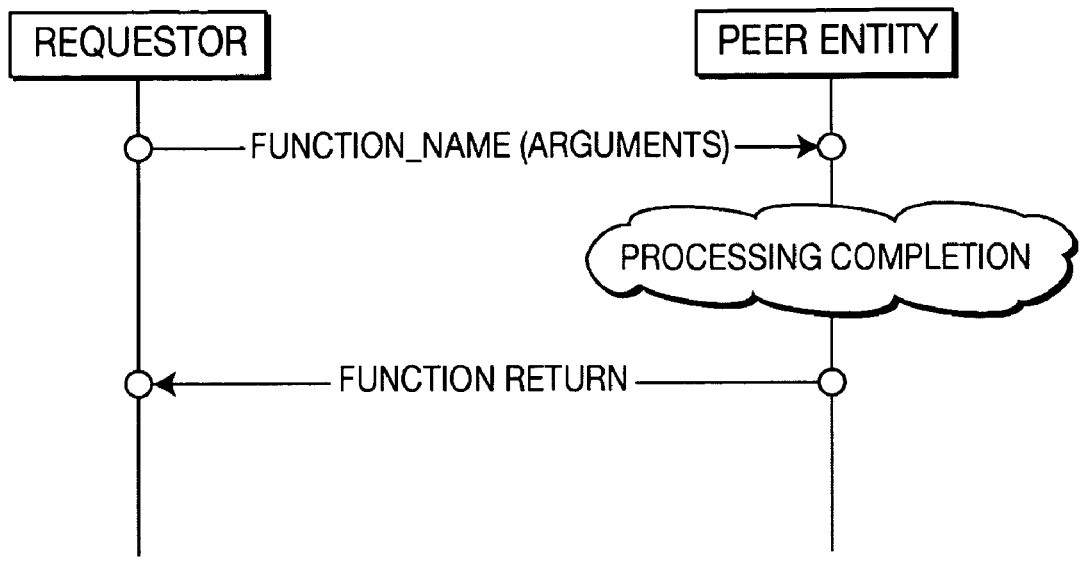
FIGS. 6A and 6B show a synchronous function call and asynchronous function call procedures, respectively.

FIG. 6A shows a synchronous function call procedure. A requester calls a function from a peer entity and the called peer entity responds with function return after processing completion. Function return is information provided by an invoked function to the caller function to indicate either the result of its operation or a code to indicate success or failure. A function returns when it has been executed until the end. The function return may indicate an operation status to the requester.

Figure 6B:
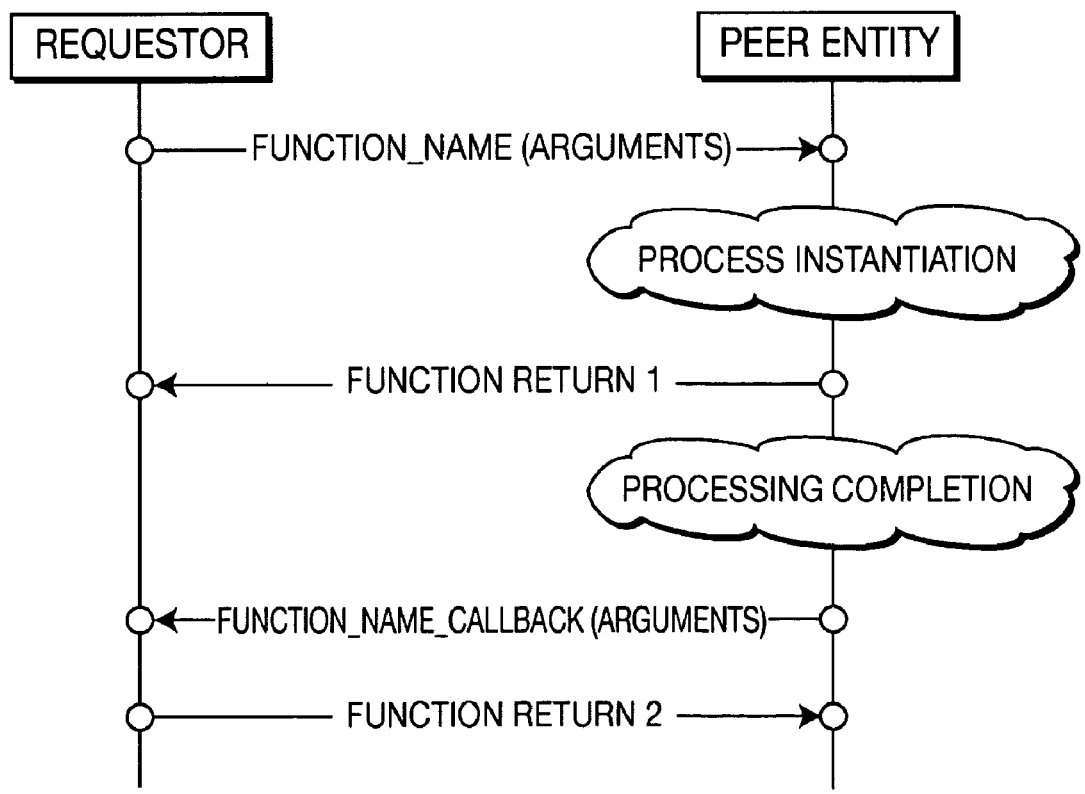

FIG. 6B shows an asynchronous function call procedure. A requester calls a function from a peer entity and the peer entity first responds with first function return after the called process instantiation without completing the request. After the called request is performed, the peer entity calls a callback function. A callback function may be associated with an asynchronous function call. The callback function is provided by the requester and called by the peer entity, and the result of the called request is passed to the requester via the callback function.

It is noted that the following naming conventions are used herein. Function names are the same for the requests and associated callback functions except for the suffixes. "req" is used as a suffix when the function implements a request (e.g. mihc_set_req( )). "cb" is used as a suffix for the associated callback function (e.g. mihc_set_cb( )). The name of the entity implementing the request is used as the prefix for both the request and callback. A request function implemented by IMS would be called "ims_set_req( )" and the associated callback would be called "ims_set_cb( ).

Detailed examples of client API descriptions are described hereinafter. It is noted that these examples are provided purely for purposes of explaining the embodiments and are in no way limiting in scope. MIH middleware, (i.e., MIH entity), is preferably written as portable American national standards institute (ANSI) C code (.c and/or .h files) that can run on any operating system (OS) with ANSI C compiler support. The MIH middleware may run in a real-time operating system (RTOS) and/or multi-threaded environment. An external (non-MIH) thread starts and stops the MIH middleware. The MIH middleware may share some common memory space with other (non-MIH) software threads, (e.g., WiBro, MIP). Function calls are used to communicate with other (non-MIH) software threads, (e.g., MIP). The functions provided by the MIH middleware to other software threads, (e.g., to WiBro), are executed in the caller's execution time. The functions provided by other software threads, (e.g., WiBro), and called by the MIH middleware are executed during MIH middleware's execution time.

Example Software API Descriptions for WiBro Interface.

API to WiBro: wibro_config_thresh_req

Direction
   MIH Client Middleware→WiBro Device Driver

Description
   This asynchronous function call sets thresholds for WiBro link parameters such that these parameters are reported as soon as the thresholds are crossed
   The function is provided by the WiBro Device Driver and the corresponding callback is provided by the MIH Client Middleware
   This function should be invoke as soon as the MIH Client Middleware receives MIH_Configure_Thresholds.request from the MIH Server
   When invoked, the function configures all the requested thresholds in the WiBro Device Driver
   After threshold configuration, the result is returned through the associated callback function Function

```
mih_ret_code wibro_config_thresh_req
    (    num_link_param    num,
         link_param_thresh_s       param_list )
where link_param_thresh_s
    {    link_param_type       param,
         initiate_action_threshold init_thresh,
         rollback_action_threshold       rb_thresh,
         execute_action_threshold exec_thresh,
         time_interval            interval      }
```

Parameters
   num: Number of parameters for which thresholds are to be set
   param: Parameter for which threshold is being set (e.g. RSSI)
   init_thresh: Threshold value to initiate setup of an action
   rb_thesh: Threshold (hysteresis) to stop action setup procedure
   exec_thresh: Threshold value to cause action to occur immediately
   interval: Time interval at which parameter is to be reported once threshold is crossed (0 for one-time report)

Return
   MIH_SUCCESS to indicate function call success and thresholds configuration attempt
   MIH_ERROR to indicate function call failure Callback function
   wibro_config_thresh_cb (link_thresh_status);

API to Middleware: wibro_config_thresh_cb

Direction
   WiBro Device Driver→MIH Client Middleware

Description
   This callback function is a response to requests for configuring thresholds for link parameter reporting
   The callback is provided by the MIH Client Middleware and the corresponding request function call is provided by the WiBro Device Driver
   When invoked, the function sends a MIH_Configure_Thresholds.confirm message to the MIH Server for the WiBro link using the information in the arguments Function

```
mih_ret_code wibro_config_thresh_cb
    (    link_thresh_status status_code )
```

Parameters
   status_code: Code to indicate status of the threshold configuration attempt Return
   MIH_SUCCESS to indicate function call success
   MIH_ERROR to indicate function call failure Corresponding request function
   wibro_config_thresh_req (num_link_type, link_param_thresh_s);

API to Middleware: wibro_link_going_down_ind

Direction
   WiBro Device Driver→MIH Client Middleware

Description
   This synchronous function call acts as an indication to the MIH Client Middleware that the currently serving AP belongs to a WiBro border cell
   The function call is provided by the MIH Client Middleware
   When invoked, the function may send MIH_Link_Going_Down to the MIH Server
   The function initiates preparatory measures for a MIH handover Function

```
mih_ret_code wibro_link_going_down_ind
    (    time_interval         interval,
         confidence_level  confidence,
         reason_code       reason,
         event_id              id)
```

Parameters
   interval: Expected time till connectivity loss
   confidence: Level of confidence in prediction, expressed as fraction
   reason: Reason for connectivity loss
   id: Unique 16-bit number to associate with the event Return
   MIH_SUCCESS to indicate function call success
   MIH_ERROR to indicate function call failure Callback function
   No callbacks associated with this function wibro_link_going_down_ind may be named to mihc_wibro_event_ind. wibro_link_going_down_ind could be indicated with a specified confidence that the WiBro link would be unavailable with a specified interval due to a specified reason. In addition to this functionality, the following may be indicated to the MIH entity by mihc_wibro_event_ind:
  WiBro coverage has been detected;
  Association with a WiBro base station has been created;
  WiBro link has become completely unavailable due to a specified reason; and
  Previous prediction for link's becoming unavailable is being recalled because the reason does not exist anymore.
Direction:
  WiBro Device Driver→MIH Client Middleware
Description:
  This synchronous function call allows the WiBro device to generate general purpose indications to the Mobility Client Middleware.
  The argument to be passed will be treated (by cast) according to the nature of indication. Table 6 shows the relationship between the indication type and the corresponding argument type.
Function

```
void mihc_wibro_event_ind
    (mihc_event_ind_t *event_ind_p, void *arg_p)
```

Parameters
  event_ind_p: Pointer to structure holding the event type and POA_MAC or BSID
  arg_p: Pointer to variable argument, depending of the event type

| | |
|---|---|
| LINK_UP | null |
| LINK_DETECTED | TRUE/FALSE |
| LINK_DOWN | reason |
| LINK_EVENT_ROLLBACK | Uint16 (event identifier) |
| LINK_GOING_DOWN | interval, confidence, reason, identifier |

Return
  None
Callback function
  No callbacks associated with this function
API to Middleware: wibro_param_report_ind
Direction
  WiBro Device Driver→MIH Client Middleware
Description
  This synchronous function acts as an report for various link parameters (such as RSSI, BER, etc.) when the values of these parameters go below a threshold value pre-configured by the MIH Middleware Client
  The function call is provided by the MIH Client Middleware
  When invoked, the function checks if the parameter value is indeed below the threshold
  If it is, the function sends MIH_Link_Parameters_Report.indication to the MIH Server using the information contained in arguments
Function

```
mih_ret_code wibro_link_param_report_ind
    (   num_link_param  num_param,
        link_parameter_s  param_list_s)
```

Parameters
  num_param: Number of parameters in the parameters' structure
  param_list_s: Structure containing link parameters and their current values
Return
  MIH_SUCCESS to indicate function call success
  MIH_ERROR to indicate function call failure
Callback function
  No callbacks associated with this function
Note
  This function is used for reporting signal strength metrics to the MIH Client Middleware
API to WiBro: wibro_link_action_req
Direction
  MIH Client Middleware→WiBro Device Driver
Description
  This synchronous function turns on/off or otherwise changes the status of WiBro device
  The function is provided by the WiBro Device Driver and the corresponding callback is provided by the MIH Client Middleware
  This function should be executed as soon as the MIH Client Middleware receives MIH_Switch.request from the MIH Server
  WiBro device driver performs a link action based on the action code received as argument
  WiBro device returns the resulting link status after performing the action by using the associated callback function
Function

```
mih_ret_code wibro_link_action_req
    (   link_action_type   action)
```

Parameters
  action: Type of action to be performed by the UMTS driver (e.g. power on, power off, go to connected mode, etc.)
Return
  MIH_SUCCESS to indicate function call success and link action set attempt
  MIH_ERROR to indicate function call failure
Callback function
  wibro_link_action_cb (link_status);
Note
  This function could generally used to power on/off the WiBro stack
API to Middleware: wibro_link_action_cb
API Name: wibro_link_action_cb
  Direction: WiBro Device Driver→MIH Client Middleware
Description
  This callback function is a response to requests for link action for the WiBro Device Driver
  The callback is provided by the MIH Client Middleware and the corresponding request function call is provided by the WiBro Device Driver
  When invoked, the function sends a MIH_Switch.confirm message if the link action request had been sent as a result of a MIH_Switch.request command
  The function may start QoS mapping procedures Function ---
mih_ret_code wibro_link_action_cb
( link_status status)
---

Parameters
   link_status: Status of the WiBro link after performing the link action
Return
   MIH_SUCCESS to indicate function call success
   MIH_ERROR to indicate function call failure
Corresponding request function
   wibro_link_action_req (link_action_type action);
Note
   The function may or may not be associated with MIH_Switch.confirm response
API to WiBro: wibro_get_param_req
Direction
   MIH Client Middleware→WiBro Device Driver
Description
   This asynchronous function call checks for and returns the present value of specified link parameters (e.g. RSSI, BER, SNR, C/I, Data rate) for the WiBro stack
   The function is provided by the WiBro Device Driver and the corresponding callback function is provided by the MIH Client Middleware
   This function should also be invoked as soon as the MIH Client Middleware receives MIH_Get_Status.request from the MIH Server
   When invoked, the function retrieves status or values of the requested UMTS parameters in the argument
   The function stores the values of request parameters in the structure that specifies the link of link parameters required
   To return the values to the MIH Client Middleware, the associated callback function is used passing a pointer to the location where the parameters are stored
Function ---
mih_ret_code wibro_get_param_req
( link_parameter_sp wibro_param_sp )
---

Parameters
   wibro_param_sp: Pointer to structure containing the parameters (RSSI, SNR, C/I, BER, Data Rate) for which values are being requested (value fields set to 0 in request)
Return
   MIH_SUCCESS to indicate function call success and link parameter retrieval attempt
   MIH_ERROR to indicate function call failure
Callback function
   wibro_get_param_cb (link_parameter_sp);
API to Middleware: wibro_get_param_cb
Direction
   WiBro Device Driver→MIH Client Middleware
Description
   This callback function is a response to requests for link parameter values
   The callback is provided by the MIH Client Middleware and the corresponding request function call is provided by the WiBro Device Driver
   When invoked, the function computes the QoS class of the currently active session based on the arguments received
   The function may initiate QoS mapping procedures
   If MIH_Get_Status.request had been received, MIH_Get_Status.confirm is sent as well
Function ---
mih_ret_code wibro_link_get_param_cb
( link_parameter_sp wibro_param_sp )
---

Parameters
   wibro_param_sp: Pointer to structure containing link parameters (RSSI, SNR, C/I, BER, Data Rate) and their corresponding values at the time of the function call
Return
   MIH_SUCCESS to indicate function call success
   MIH_ERROR to indicate function call failure
Corresponding request function
   wibro_get_param_req (link_parameter_sp)
Software API descriptions for UMTS interface (i.e., WCDMA interface). As noted above, the prefix "UMTS" may be used interchangeably with "WCDMA".
API to UMTS: umts_get_param_req
Direction
   MIH Client Middleware→UMTS Device Driver
Description
   This asynchronous function call checks for and returns the present value of specified link parameters (e.g. RSSI, BER, SNR, C/I, Data rate) for the UMTS stack
   The function is provided by the UMTS Device Driver and the corresponding callback function is provided by the MIH Client Middleware
   This function should be invoked as soon as the MIH Client Middleware receives MIH_Link_Get_Parameters.request from the MIH Server
   When invoked, the function retrieves status or values of the requested UMTS parameters in the argument
   The function stores the values of request parameters in the structure that specifies the link of link parameters required
   To return the values to the MIH Client Middleware, the associated call back function is used passing a pointer to the location where the parameters are stored
Function ---
mih_ret_code umts_get_param_req
( link_parameter_sp umts_param_sp )
---

Parameters
   umts_param_sp: Pointer to structure containing the parameters (RSSI, SNR, C/I, BER, Data Rate) for which values are being requested (value fields set to 0 in request)
Return
   MIH_SUCCESS to indicate function call success and link parameter retrieval attempt
   MIH_ERROR to indicate function call failure Callback function
    umts_get_param_cb (link_parameter_sp);
Note
    When feasible, the function could invoke AT+CSQ command to perform the actions upon receipt
API to Middleware: umts_get_param_cb
Direction
    UMTS Device Driver→MIH Client Middleware
Description
    This callback function is a response to requests for link parameter values
    The callback is provided by the MIH Client Middleware and the corresponding request function call is provided by the UMTS Device Driver
    When invoked, the function records the parameters and computes a QoS class UMTS link
    If necessary, QoS mapping procedures might be initiated
    If MIH_Get_Status.request had been received, MIH_Get_Status.confirm is sent
Function

| mih_ret_code umts_get_param_cb |
|---|
| ( link_parameter_sp umts_param_sp ) |

Parameters
    umts_param_sp: Pointer to structure containing link parameters (RSSI, SNR, C/I, BER, Data Rate) and values for these parameters
Return
    MIH_SUCCESS to indicate function call success
    MIH_ERROR to indicate function call failure
Corresponding request function
    utms_get_param_req (link_parameter_sp);
API to UMTS: umts_link_action_req
Direction
    MIH Client Middleware→UMTS Device Driver
Description
    This synchronous function turns on/off or otherwise changes the status of UMTS device
    The function is provided by the UMTS Device Driver and the corresponding callback is provided by the MIH Client Middleware
    This function should be executed as soon as the MIH Client Middleware receives MIH_Switch.request from the MIH Server
    UMTS device driver performs one of the following based on the action code received as argument:
        power on and go to IDLE mode
        go to CONNECTED mode and activate PDP context
        deactivate PDP context and release RAB
    UMTS device returns the resulting link status after performing the action by using the associated callback function
Function

| mih_ret_code umts_action_req |
|---|
| ( link_action_type action ) |

Parameters
    action: Type of action to be performed by the UMTS driver (e.g., power on, power off, go to connected mode, etc.)
Return
    MIH_SUCCESS to indicate function call success and link action set attempt
    MIH_ERROR to indicate function call failure
Callback function
    umts_action_cb (link_status);
Note
    When feasible, this function could invoke a combination of the following commands:

| AT+CFUN: | start up terminal |
|---|---|
| AT+CGEQREG: | specify QoS profile |
| AT+CGATT: | PS attach/detach |
| AT+CGREG?: | network registration status query |
| AT+CGACT: | activate/deactivate PDP context |
| AT+CGDCONT?: | PDP context setting query |
| AT+CGDATA: | enter data state |

API to Middleware: umts_link_action_cb
Direction
    UMTS Device Driver→MIH Client Middleware
Description
    This callback function is a response to requests for link action for the UMTS Device Driver
    The callback is provided by the MIH Client Middleware and the corresponding request function call is provided by the UMTS Device Driver
    When invoked, the function sends a MIH_Switch.confirm message if the link action request had been sent as a result of a MIH_Switch.request command
    The function may also start QoS mapping procedures
Function

| mih_ret_code umts_link_action_cb |
|---|
| ( link_action_status action_status ) |

Parameters
    link_status: Status code for the link power and mode indication
Return
    MIH_SUCCESS to indicate function call success
    MIH_ERROR to indicate function call failure
Corresponding request function
    umts_link_action_req (link_action_type);
Note
    The function may or may not be associated with MIH_Switch.confirm response QoS parameters may be passed to wcdma_action_req. The foregoing umts_link_action_req and umts_link_action_cb functions could change power mode. wcdma_action_req API may specify WCDMA low power mode behavior through new AT Command description and configure WCDMA QoS parameters. Function names modified as follows:
    umts_link_action_req( ) renamed to wcdma_action_req( )
    umts_link_action_cb( ) renamed to wcdma_action_cb( )
Direction:
Mobility Client Middleware→WCDMA Device Driver
Description:
    This asynchronous function changes the status of WCDMA device. The function is provided by the WCDMA Device Driver and the corresponding callback is provided by the Mobility Client Middleware.

This function is executed when the Mobility Client Middleware receives handover from the MIH Server. The function may also be invoked by the MCM for other reasons.

WCDMA device returns the resulting link status after performing the action by using the associated callback function.

Function

```
mihc_ret_code wcdma_action_req
    (   mihc_link_action_type_e action,
        mihc_ip_qos_t      *ip_qos_p,
        void               *user_data_p )
```

Parameters
    action: Type of action to be performed by the UMTS driver
    ip_qos_p: Pointer to the IP addresses and corresponding QoS in use.
    user_data_p:Pointer to be passed back when calling the associated callback function.
Return
    MIH_SUCCESS to indicate function call success and link action set attempt
    MIH_ERROR to indicate function call failure
Callback function
    wcdma_action_cb ( );
Note
    When feasible, this function could invoke a combination of the following commands:

| | |
|---|---|
| AT+CFUN: | Start up terminal. Camp on cell. Do not register to network. Turn off TX. |
| AT+CGDCONT: | Create a PDP context |
| AT+CGEQREG: | Specify QoS profile |
| AT+CGATT: | PS attach/detach |
| AT+CGREG?: | Network registration status query |
| AT+CGACT: | Activate/deactivate PDP context |
| AT+CGDCONT?: | PDP context setting query |

Software API descriptions for mobile IP client.
API to Mobile IP: mip4_discover_fa_req
Direction
    MIH Client Middleware→Mobile IP Client
Description
    This asynchronous function call discovers the Mobile IP foreign agent using the associated protocol (as described in the reference under Notes)
    The function is provided by the Mobile IP Client and the corresponding callback is provided by the MIH Client Middleware
    The function should usually be invoked whenever the MIH Client Middleware powers on an L2 device
    Once invoked, Mobile IP sends a Router Solicitation
    After Router Advertisement is received, Mobile IP completes the protocol to obtain a new IP
    Mobile IP confirms the results of FA discovery by invoking the associated callback function
Function

```
mih_ret_code mip4_discover_fa_req
    (   mip_hoa_ip ip )
```

Parameters
    ip: Home Address for which Foreign Agent has to be discovered
Return
    MIH_SUCCESS to indicate function call success and FA discovery attempt initiation
    MIH_ERROR to indicate function call failure
Callback function
    mip4_discover_fa_cb (ip_config_status, mip_new_ip, mip_hoa_ip);
API to Middleware: mip4_discover_fa_cb
Direction
    Mobile IP Client→MIH Client Middleware
Description
    This callback function is a response to Mobile IP Foreign Agent discovery request
    The callback is provided by the MIH Client Middleware while the corresponding request function call is provided by the Mobile IP Client
    When invoked, the MIH Client Middleware will store any IP passed as argument
    The function will also make an attempt to find and store the QoS class associated with the IP
    The function will initiate a Mobile IP Binding Update procedure for the IP received
Function

```
mih_ret_code mip4_discover_fa_cb
    (   ip_config_status   status,
        mip_new_ip         mt_ip,
        mip_hoa_ip         hoa_ip)
```

Parameters
    status: Code to indicate whether new IP has been obtained
    mt_ip:IP address obtained for the Mobile Terminal
    ma_ip: Home Address associated with the IP address received
Return
    MIH_SUCCESS to indicate function call success
    MIH_ERROR to indicate function call failure
Corresponding request function
    mip4_discover_fa_req (mip_hoa_ip);
Note
The callback is an indication that the device is IP-capable
API to Mobile IP: mip4_send_bu_req
Direction
    MIH Client Middleware→Mobile IP Client
Description
    This asynchronous function call sends a Mobile IP Registration Request to create a binding with the Home Agent
    The function is provided by the Mobile IP Client and the corresponding callback function is provided by the MIH Client Middleware
    The function should be invoked as soon as MIH Client Middleware receives indication of a new IP's having been configured
    Once invoked, Mobile IP sends a Registration Request to the Home Agent and performs the associated protocol (described in the reference under Notes) to create a binding with the care of address
    When Registration Reply is received, the MIH Client Middleware should be informed through the associated callback function Function ---
mih_ret_code mip4_send_bu_req
( mip_new_ip ip )
---

Parameters
   ip: IP address for which binding update request is being made
Return
   MIH_SUCCESS to indicate function call success and registration request dispatch
   MIH_ERROR to indicate function call failure
Callback function
   mip4_send_bu_cb (mip_bu_status);
API to Middleware: mip4_send_bu_cb
Direction
   Mobile IP Client→MIH Client Middleware
Description
   This callback function is a response to Mobile IP Binding Update request
   The callback is provided by the MIH Client Middleware while the corresponding request function call is provided by the Mobile IP Client
   When invoked, the function may initiate re-establishment of sessions for various upper layer protocols (such as SIP)
Function ---
mih_ret_code mip4_send_bu_cb
( mip_bu_status status )
---

Parameters
   status: Code to indicate whether binding update is complete
Return
   MIH_SUCCESS to indicate function call success
   MIH_ERROR to indicate function call failure
Corresponding request function
   mip4_send_bu_req (mip_new_ip);
Note
   The callback is an indication that the device is IP-capable and its home agent is tunneling packets to the care-of address
API to Mobile IP: mip4_ip_info_req
Direction
   MIH Client Middleware→Mobile IP Client
Description
   This function retrieves information about the IP addresses being handled by the Mobile IP Client
   The results are provided to the MIH Client Middleware using the associated callback function
   Once invoked, Mobile IP returns the number of IP addresses that are currently associated with Mobile Terminal using the callback function associated
   The function also gives the MIH Client Middleware the Home Address corresponding to each IP in use
Function
   mih_ret code mip4_ip_info_req( )
Parameters
   No parameters are passed as arguments
Return
   MIH_SUCCESS to indicate function call success IP information retrieval attempt
   MIH_ERROR to indicate function call failure
Callback function
   mip4_ip_info_cb (num_ip, mip_hoa_ip_s);
API to Middleware: mip4_ip_info_cb
Direction
   Mobile IP Client→MIH Client Middleware
Description
   This callback function is a response to Mobile IP address assignment information request
   The callback is provided by the MIH Client Middleware while the corresponding request function call is provided by the Mobile IP Client
   When invoked, the function triggers processing of PDP contexts for the WCDMA based on the number of active IPs and the corresponding Home Addresses received
   The function also initiates IP configuration for any newly activated interface
Function ---
mih_ret_code mip4_ip_info_cb
( num_ip num,
mip_hoa_ip_s hoa_ip_s)
---

Parameters
   num: Number of IP addresses allocated to the Mobile Terminal
   hoa_ip_s: Structure containing Home Addresses corresponding to the IPs currently active
Return
   MIH_SUCCESS to indicate function call success
   MIH_ERROR to indicate function call failure
Corresponding request function
   mip4_ip_info_req( ).

mip4_send_bu_req may trigger a mobile IP registration. The registration may precede with agent discovery procedure with the following functions:
mip4_ha_addr_req( ); and
mip4_ha_addr_cb( ).
API to Mobile IP: mip4_registration_req
Direction
   MIH Client Middleware→Mobile IP Client
Description
   This asynchronous function call triggers the Mobile IP foreign agent discovery and the transmission of a Mobile IP Re-registration Request to update a binding with the Home Agent.
   The function is provided by the Mobile IP Client and the corresponding callback function is provided by the Mobility Client Middleware.
   The function is invoked when Mobility Client Middleware has successfully performed a handover and that the new link layer is set up.
   Once invoked, Mobile IP sends a Router Solicitation. After Agent Advertisement is received, Mobile IP sends a Registration Request to the Home Agent and performs the associated protocol (described in the reference under Note) to create a binding with the care of address.
   When Registration Reply is received, the Mobility Client Middleware should be informed through the associated callback function.

Function

---
mihc_ret_code mip4_registration_req
( void *user_data_p )

---

Parameters
   user_data_p:Pointer to be passed back when calling the associated callback function
Return
   MIH_SUCCESS to indicate function call success and registration request dispatch
   MIH_ERROR to indicate function call failure
Callback function
   mip4_registration_cb( );
API to Middleware: mip4_registration_cb
Direction
   Mobile IP Client→MIH Client Middleware
Description
   This callback function is a response to Mobile IP Registration request. The callback is provided by the Mobility Client Middleware while the corresponding request function call is provided by the Mobile IP Client
Function ---
void mip4_registration_cb
( mihc_mip4_status_e status, void *user_data_p )

---

Parameters
   status: Code to indicate whether binding update is complete.
   user_data_p: Pointer that has been passed when calling the associated request function.
Return
   None
Corresponding request function
   mip4_registration_req( );
Note
   The callback is an indication that the device is IP-capable and its home agent is tunneling packets to the care-of address
API to Mobile IP: mip4_ha_addr_req
Direction
   MIH Client Middleware→Mobile IP Client
Description
   This asynchronous function call checks for and returns the current mobile node home agent IP address.
   The function is provided by the Mobile IP Client and the corresponding callback function is provided by the Mobility Client Middleware.
   When invoked, the function retrieves the current mobile node home agent IP address.
   To return the values to the Mobility Client Middleware, the associated callback function is used.
Function ---
mihc_ret_code_e mip4_ha_addr_req
( void *user_data_p )

---

Parameters
   user_data_p:Pointer to be passed back when calling the associated callback function. It is not intended to be used by the request provider.
Return
   MIH_SUCCESS to indicate function call success and FA discovery attempt initiation
   MIH_ERROR to indicate function call failure
Callback function
   mip4_ha_addr_cb( );
API to Middleware: mip4_ha_addr_cb
Direction
   Mobile IP Client→MIH Client Middleware
Description
   This callback function is a response to Mobile IP Home Agent Address Request.
   The callback is provided by the Mobility Client Middleware while the corresponding request function call is provided by the Mobile IP Client
Function ---
void mip4_ha_addr_cb
( in_addr ip_addr, void *user_data_p )

---

Parameters
   ip_addr: Structure that contains the mobile node current Home Agent IP address.
   user_data_p:Pointer that has been passed when calling the associated request function
Return
   None
Corresponding request function
   mip4_ha_addr_req( );
Software API descriptions for IMS/SIP client.
API to IMS: ims_discover_req
Direction
   MIH Client Middleware→Client IMS Stack
Description
   This asynchronous function call performs IP discovery of a named element (e.g. P-CSCF, etc.) in the IMS core network
   The function is provided by the IMS Client Stack and the corresponding callback is provided by the MIH Client Middleware
   When invoked, the function attempts to discover the IP address of the requested IMS entity through the use of DHCP (e.g. dhcp_discover_req( ) function)
   Once IP discovery is complete, the result is returned to the MIH Client Middleware using the associated callback function
   This function should be used to discover the IMS P-CSCF
Function ---
mih_ret_code ims_discover_req
( peer_type peer )

---

Parameters
   peer: Name of remote entity (e.g. P-CSCF, S-CSCF, etc.) whose IP is required
Return
   MIH_SUCCESS to indicate function call success and IP discovery attempt initiation
   MIH_ERROR to indicate function call failure Callback function
    ims_discover_cb (peer_addr_s);
API to Middleware: ims_discover_cb
Direction
    IMS Client→MIH Client Middleware
Description
    This callback function is a response to IMS entity discovery request
    The callback is provided by the MIH Client Middleware while the corresponding request function call is provided by the IMS Client
    When invoked, the function removes any previously stored IP for the node in question and store the newly received IP address for future use
    In addition, the function may also trigger IMS registration
Function

| mih_ret_code ims_discover_cb ( peer_addr_s addr_s ) |
| --- |

Parameters
    addr_s: Structure containing entity name and corresponding IP address
Return
    MIH_SUCCESS to indicate function call success
    MIH_ERROR to indicate function call failure
Corresponding request function
    ims_discover_req (peer_type);
Note
    The callback can provide the MIH Client Middleware with IP address of the P-CSCF
API to IMS: ims_reg_req
Direction
    MIH Client Middleware→Client IMS Stack
Description
    This asynchronous function call registers the client to the IMS network for IMS services
    The function is provided by the Client IMS Stack and the corresponding callback is provided by the MIH Client Middleware
    When invoked, the function attempts to register to the IMS network using the parameters received as arguments
    Once registration is complete, and a registration acknowledgement is received, registration parameters are returned to the MIH Client Middleware using the associated callback function
    This function should be used to send IMS register or re-invite messages
Function

| mih_ret_code ims_reg_req ( ims_reg_param_s param_s ) |
| --- |

Parameters
    param_s: Struction containing parameters associated with IMS session registration
Return
    MIH_SUCCESS to indicate function call success and IMS registration initiation
    MIH_ERROR to indicate function call failure Callback function
    ims_reg_cb (ims_session_info_s);
API to Middleware: ims_reg_cb
Direction
    IMS Client→MIH Client Middleware
Description
    This callback function is a response to an IMS registration request
    The callback is provided by the MIH Client Middleware and the corresponding request is provided by the IMS Client
    When invoked, the function will store partially or entirely the information about the IMS session
Function

| mih_ret_code ims_reg_cb ( ims_session_info_s ses_info_s ) |
| --- |

Parameters
    ses_info_s: Structure containing parameters associated with the IMS registration session
Return
    MIH_SUCCESS to indicate function call success
    MIH_ERROR to indicate function call failure
Corresponding request function
    ims_reg_req (ims_reg_param_s param_s);
    The callback acts as a confirmation for an IMS registration request
Software API descriptions for UDP/IP stack.
API to UDP/IP: udp_sendmsg_req
Direction
    MIH Client Middleware→UDP/IP Stack
Description
    This asynchronous function sends a given message to a recipient based on IP and port information passed as arguments
    Handle to the corresponding callback function is passed as an argument
    When invoked, the function will try to send via UDP the number of bytes indicated in the arguments form the location pointed to in the argument
    The number of bytes that are successfully sent is returned to the invoking function through the callback whose pointer is passed
    This is a general purpose function that can be used for any UDP packet dispatch
Function

| mih_ret_code udp_sendmsg_req | |
| --- | --- |
| ( func_p | udp_sendmsg_cb_p, |
| addr_info | addr, |
| message_p | msg_p, |
| length | send_len ) |

Parameters
    udp_sendmsg_cb_p: Pointer to callback function
    addr: Address and port number to be used to send data to peer entity (e.g. MIH Server)
    msg_p: Pointer to message to be sent
    send_len: Number of bytes to be sent
Return
    MIH_SUCCESS to indicate function call success and UDP send attempt
    MIH_ERROR to indicate function call failure Callback function
   udp_sendmsg_cb (length send_len);
API to UDP/IP: udp_sendmsg_cb
Direction
   UDP/IP Stack→MIH Client Middleware
Description
   This callback function provides length of the packet sent via UDP to the corresponding entity that had requested the dispatch
   The callback is provided by the MIH Client Middleware and the corresponding request is provided by the UDP/IP Stack
   Once invoked, the function verifies the number of bytes sent
   If the verification succeeds, the function may trigger ACK timers if ACK had been requested
   This is a general purpose function that can be used for any UDP packet dispatch
Function

--- mih_ret_code udp_sendmsg_cb
( length    send_len )

---

Parameters
   send_len: Number of bytes sent
Return
   MIH_SUCCESS to indicate function call success
   MIH_ERROR to indicate function call failure
Corresponding request function
   udp_sendmsg_req (func_p, addr_info addr, message_p msg_p, length send_len)
API to UDP/IP: udp_recvmsg_req
Direction
   MIH Client Middleware→UDP/IP Stack
Description
   This asynchronous function receives a UDP packet from a peer and passes relevant information to the invoking function
   Handle to the corresponding callback function is passed as an argument
   Once invoked, the function waits and receives a UDP packet
   When the packet is received, the function stores a pointer to the message content, a number indicating the message length and address information for the sender
   The stored data concerning the UDP packet reception is passed to the invoking function through the associated callback function
   This is a general purpose function that can be used for any UDP packet reception
Function

--- mih_ret_code udp_recvmsg_req
( func_p    udp_recvmsg_cb_p )

---

Parameters
   udp_recvmsg_cb_p: Pointer to callback function
Return
   MIH_SUCCESS to indicate function call success and UDP reception initiation
   MIH_ERROR to indicate function call failure Callback function
   udp_recvmsg_cb (addr_info_p, message_p, length);
API to UDP/IP: udp_recvmsg_cb
Direction
   UDP/IP Stack→MIH Client Middleware
Description
   This callback function provides a message packet received via UDP to the corresponding entity that had request the reception
   The callback is provided by the MIH Client Middleware and the corresponding request is provided by the UDP/IP Stack
   Once invoked, the function retrieves the message that has been received
   The function also retrieves and temporarily stores the IP address information about the recipient
   The function verifies the length of the received message
   This is a general purpose function that can be used for any UDP packet reception
Function

--- mih_ret_code udp_recvmsg_cb
( addr_info_p addr_p,
  message_p    msg_p,
  length       len)

---

Parameters
   addr_p: Pointer to location storing address information of sender
   msg_p: Pointer to location where message is being stored
   len: Length in bytes of the message received
Return
   MIH_SUCCESS to indicate function call success
   MIH_ERROR to indicate function call failure
Corresponding request function
   udp_recvmsg_req (func_p);
Software API Descriptions for DHCP Stack
API to DHCP: dhcp_discover_req
Direction
   MIH Client Middleware→Client DHCP Stack
Description
   This asynchronous function call performs discovery of IP address of a particular named network entity (e.g. MIH Server, IMS entities, etc.) through the use of DHCP
   Handle to the corresponding callback function is passed as an argument
   When invoked, the DHCP stack on the client end queries the DHCP server for the IP address of the desired network entity
   Once discovery is complete, the resulting IP address is provided to the invoking entity through the associated callback function a pointer to which is provided as argument
   This function should be used to discover the MIH Server or IMS P-CSCF before performing a handover
Function

--- mih_ret_code dhcp_discover_req
( func_p    dhcp_discover_cb_p
  peer_type peer )

---

Parameters
   dhcp_discover_cb_p: Pointer to the callback function
   peer: Name of remote entity (e.g. MIH Server, P-CSCF, etc.) whose IP is required Return
   MIH_SUCCESS to indicate function call success and IP discovery attempt initiation
   MIH_ERROR to indicate function call failure Callback function
   mih_ret_code dhcp_discover_cb (peer_addr_s);

API to Middleware: dhcp_discover_cb

Direction
   Client DHCP Stack→MIH Client Middleware

Description
   This callback function is a response to a request to the DHCP Stack to find the IP address of a network node
   The callback is provided by the MIH Client Middleware and the corresponding request is provided by the Client DHCP Stack
   When invoked, the function stores the received IP address for future use
   The function may also initiate MIH or IMS registration based on the information provided in the argument
   The callback can be used to provide the MIH Client Middleware with IP addresses of the MIH Server and the P-CSCF Function

--- mih_ret_code dhcp_discover_cb
(   peer_addr_s addr_s)

---

Parameters
   addr_s: Structure containing entity name and corresponding IP address Return
   MIH_SUCCESS to indicate function call success
   MIH_ERROR to indicate function call failure Corresponding request function
   dhcp_discover_req (peer_type)

Software API descriptions for O&M interface.

API to Middleware: mihc_activate_req

Direction
   O&M Interface→MIH Client Middleware

Description
   This asynchronous function activates the functionalities of the MIH Client Middleware
   The function is provided by the MIH Client Middleware and the corresponding callback is provided by the O&M Interface
   Once invoked, the function activates the MIH functionalities of the MIH Client Middleware based on the arguments received
   The function initiates interactions with other entities (such as link drivers, Mobile IP, IMS client and DHCP stack)
   Once MIH Client Middleware is active, the function sends confirmation to the O&M Interface using the associated callback function and returns the Middleware's status as an argument Function

--- mih_ret_code mihc_activate_req
(   mihc_profile_sp   profile_sp   )

---

Parameters
   profile_sp: Pointer to structure with information about initialization of the MIH Client Middleware (e.g. name of the upper layer mobility protocol to be used, etc.)

Return
   MIH_SUCCESS to indicate function call success and activation attempt
   MIH_ERROR to indicate function call failure Callback function
   mihc_activate_cb (mihc_status);

API to Middleware: mihc_activate_cb

Direction
   MIH Client Middleware→O&M Interface

Description
   This function callback is a response to functionality activation requests to the MIH Client Middleware
   The callback is provided by the O&M Interface and the corresponding request is provided by the MIH Client Middleware
   When invoked, the function stores the status code from the MIH Client Middleware as a reference point for future interactions with the MIH Client Middleware Function

--- mih_ret_code mihc_activate_cb
(   mihc_status status )

---

Parameters
   status: Information about the status of the MIH Client Middleware (e.g. ON, ERROR_NO_LINK, etc.)

Return
   MIH_SUCCESS to indicate function call success
   MIH_ERROR to indicate function call failure Corresponding request function
   mihc_activate_req (mihc_profile_s);
   This function is a callback to mihc_activate_req (mihc_profile_s) call on the MIH Client Middleware API to Middleware: mihc_deactivate_req Direction
   O&M Interface→MIH Client Middleware Description
   This asynchronous function deactivates the functionalities of the MIH Client Middleware
   The function is provided by the MIH Client Middleware and the corresponding callback is provided by the O&M Interface
   Once invoked, the function stores the current functional settings of the MIH Client Middleware at the location passed as argument
   The function call deactivates the MIH functionalities of the MIH Client Middleware
   The function suspends interactions with other entities (such as link drivers, Mobile IP, IMS client and DHCP stack)
   Once MIH Client Middleware is inactive, the function confirms using the associated callback function and passes the Middleware's status as an argument
   This function puts MIH Client Middleware in a inactive mode Function ---
mih_ret_code mihc_deactivate_req
( mihc_profile_sp profile_sp )
---

Parameters
   profile_sp: Pointer to structure where current context of MIH Client Middleware should be stored before suspending operation
Return
   MIH_SUCCESS to indicate function call success and deactivation attempt
   MIH_ERROR to indicate function call failure
Callback function
   mihc_deactivate_cb (mihc_status);
API to Middleware: mihc_deactivate_cb
Direction
   MIH Client Middleware→O&M Interface
Description
   This function callback is a response to functionality deactivation requests to the MIH Client Middleware
   The callback is provided by the O&M Interface and the corresponding request is provided by the MIH Client Middleware
   When invoked, the function stores the status code from the MIH Client Middleware as a reference point for future interactions with the MIH Client Middleware
Function ---
mih_ret_code mihc_activate_cb
( mihc_status status )
---

Parameters
   status: Information about the status of the MIH Client Middleware (e.g. OFF, ERROR_SES_ACTIVE, etc.)
Return
   MIH_SUCCESS to indicate function call success
   MIH_ERROR to indicate function call failure
Corresponding request function
   mihc_deactivate_req (mihc_profile_sp);
   This function is a callback to mihc_deactivate_req (mihc_profile_sp) call on the MIH Client Middleware
API to Middleware: mihc_param_req
Direction
   O&M Interface→MIH Client Middleware
Description
   This asynchronous function call retrieves the functional parameters of the MIH Client Middleware and returns them to the O&M Interface
   The function is provided by the MIH Client Middleware and the corresponding callback is provided by the O&M Interface
   When invoked, the function retrieves the requested parameters of the MIH Client Middleware
   The parameters values are stored in a structure and the pointer is passed to the O&M Interface using the associated callback
   This function can be used by the O&M Interface for various reasons including, but not limited to, testing and debugging Function ---
mih_ret_code mihc_param_req
( mih_param_sp param_sp )
---

Parameters
   param_sp: Pointer to list of MIH parameters that are being requested
Return
   MIH_SUCCESS to indicate function call success and parameter retrieval attempt
   MIH_ERROR to indicate function call failure
Callback function
   mihc_param_cb (mih_param_sp);
API to Middleware: mihc_param_cb
Direction
   MIH Client Middleware→O&M Interface
Description
   This callback function is a response to a request by the O&M Interface for specific MIH Client Middleware operational parameters
   The callback is provided by the O&M Interface and the corresponding request is provided by the MIH Client Middleware
   When invoked, the function replaces any pre-stored old parameters with the new parameters and stores these parameters values until another parameter request call is made
Function ---
mih_ret_code mihc_param_cb
( mihc_param_sp param_sp )
---

Parameters
   param_sp: Pointer to structure containing various parameter values
Return
   MIH_SUCCESS to indicate function call success
   MIH_ERROR to indicate function call failure
Corresponding request function
   mihc_param_req (mihc_param_sp);
   This function is a callback to mihc_param_req (mihc_param_sp) call on the MIH Client Middleware
API to Middleware: mihc_handover_ind
Direction
   MIH Client Middleware→O&M Interface
Description
   This synchronous function call stores information about a MIH-triggered handover for use by the O&M Interface
   The function call is provided by the O&M Interface
   The function should be invoked as soon as the MIH Client Middleware sends a MIH_Switch.confirm to the MIH Server
   When invoked, function makes the new link the default for the device and uses the QoS as a reference point for future IP session establishment
   This function indicates that MIH has performed a handover and that a new interface is being used for IP sessions Function ---
mih_ret_code mihc_handover_ind
( ho_info_s        info_s,
    qos_status_s qos  )
---

Parameters
   info: Information about handover completion status and the links involved in the process
   qos: Information about the old and new QoS for IP services
Return
   MIH_SUCCESS to indicate function call success
   MIH_ERROR to indicate function call failure
Callback function
   No callbacks associated with this function
The mihc_handover_ind API may be named to ncc_gen_ind. mihc_handover_ind API may be used to inform O&M of link-layer handovers. ncc_gen_ind API may be used as a general purpose indication function to provide O&M information about handovers, errors and other link layer- and MIH-related events.
   API to Middleware: ncc_gen_ind
Direction
   MIH Client Middleware→O&M Interface
Description
   This synchronous function is used by the MCM to report any event/errors that occurred.
   The memory is allocated by the caller (MCM) and is not available to the O&M client once the function returns.
   The function behaviour will depend on the indication received.
   The second function argument changes depending on the indication.
Function ---
void ncc_gen_ind
( mihc_gen_ind_e  mihc_gen_ind,
    void        *data_p )
---

Parameters
   mihc_gen_ind: Contains the indication value.
   data_p: Pointer to data related to the specified indication type.
Return
   None
Callback function
   No callbacks associated with this function
API to Middleware: mihc_umts_mode_req
Direction
   O&M Interface→MIH Client Middleware
Description
   The asynchronous function call retrieves the operation mode (data/command) of the UMTS modem
   The function call is provided by the MIH Client Middleware and the corresponding callback is provided by the O&M Interface
   When invoked, the function queries the UMTS modem for its mode using AT Commands (or SW APIs) available
   The function returns the result using the associated callback method
   This function can be used to decide if AT Commands can be sent Function
   mih_ret_code mihc_umts_mode_req( )
Parameters
   No parameters are passed as arguments
Return
   MIH_SUCCESS to indicate function call success and mode retrieval attempt
   MIH_ERROR to indicate function call failure
Callback function
   mihc_umts_mode cb (umts_mode);
API to Middleware: mihc_umts_mode_cb
Direction
   MIH Client Middleware→O&M Interface
Description
   This callback function is a response to a request for the mode of the UMTS modem (data/command)
   The callback is provided by the O&M Interface and the corresponding request function is provided by the MIH Client Middleware
   When invoked, the function stores the UMTS mode with a timestamp for future usage by the O&M Interface
Function ---
mih_ret_code mihc_umts_mode_cb
( umts_mode mode )
---

Parameters
   mode: Code to represent the mode of the UMTS modem
Return
   MIH_SUCCESS to indicate function call success
   MIH_ERROR to indicate function call failure
Corresponding request function
   mihc_umts_mode_req ( );
API to Middleware: mihc_set_config_req
Direction
   O&M Interface→MIH Client Middleware
Description
   This asynchronous function call requests to change the configuration of parameters of the Mobility Client Middleware. The function is provided by the Mobility Client Middleware and the corresponding callback is provided by the O&M.
   When invoked, the function changes the current value of the parameters to the specified one.
   The pointer to the structure is allocated by the O&M module. It's not available anymore when the function returns.
Function ---
mihc_ret_code_e mihc_set_config_req
( mihc_config_t   *config_p,
    void        *user_data_p )
---

Parameters
   config_p: Pointer to a structure holding configurable parameters.
   user_data_p:Pointer to be passed back when calling the associated callback function.
It is not intended to be used by the request provider.
Return
   MIHC_SUCCESS to indicate function call success and parameter retrieval attempt.
   MIHC_NOT_ACTIVATED to indicate function call failure because the MCM is not activated.

MIHC_INVALID_PARAM to indicate function call failure because of invalid parameters.
MIHC_ERROR to indicate function call failure
Callback function
   mihc_set_config_cb( )
API to Middleware: mihc_set_config_cb
Direction
   O&M Interface→MIH Client Middleware
Description
   This asynchronous function is a response to a request from the O&M to the Mobility Client Middleware to configure some parameters.
   The callback is provided by the O&M and the corresponding request is provided by the Mobility Client Middleware.
Function

```
              void mihc_set_config_cb
              ( mihc_ret_code_e  status,
                void             *user_data_p )
```

Parameters
   status: Status of the configuration attempt.
   user_data_p:Pointer that has been passed when calling the associated request function.
Return
   None
Corresponding request function
   mihc_set config_req( )
API to Middleware: ncc_get_qos_req
Direction
   MIH Client Middleware→O&M Interface
Description
   This asynchronous function call checks for and returns the present value of QoS and IP parameters. The function is provided by the O&M and the corresponding callback function is provided by the Mobility Client Middleware.
   When invoked, the function retrieves status or values of the O&M QoS and IP parameters in the argument. The function stores the values of request parameters in the location received as an argument. To return the values to the Mobility Client Middleware, the associated call back function is used with the pointer to the parameters received as an argument on the request.
   The memory for the parameters and their value is allocated by the caller (MCM), filled by the O&M function and released by the MCM once the callback function is called.
Function

```
           mihc_ret_code_e ncc_get_qos_req
              ( Uint8           nb_ip_qos,
                mihc_ip_qos_t   *ip_qos_p,
                void            *user_data_p )
```

Parameters
   nb_ip_qos: Number of entries in the array pointed by ip_qos_p.
   ip_qos_p: Pointer to an array containing IP addresses and QoS parameter values.
   user_data_p:Pointer that has been passed when calling the associated request function.
   It is not intended to be used by the request provider.
Return
   MIHC_SUCCESS to indicate function call success and link parameter retrieval attempt.
   MIHC_INVALID_PARAM to indicate function call failure because of invalid parameters.
   MIHC_ERROR to indicate function call failure
Callback function
   ncc_get_qos_cb( )
API to Middleware: ncc_get_qos_cb
Direction
   O&M Interface→MIH Client Middleware
Description
   This callback function is a response to a request for QoS parameter values.
   The callback is provided by the Mobility Client Middleware and the corresponding request function call is provided by the O&M.
   The parameters' list used is the one received as an argument on the request.
   The memory is allocated and released by the MCM. It is filled by the O&M library.
Function

```
              void ncc_get_qos_ind
              (   mihc_ip_qos_t   *ip_qos_p,
                  void            *user_data_p )
```

Parameters
   ip_qos_p: Pointer to QoS parameters and values for these parameters.
   user_data_p:Pointer that has been passed when calling the associated request function
Return
   None
Corresponding request function
   ncc_get_qos_req( )
AT command descriptions for expected behaviour are described hereinafter.
   AT-Command: AT+CSQ
   Command Name: AT+CSQ
      Direction: MIH Client Middleware→UMTS Device Driver
   Function
      AT+CSQ
   Parameters
      No parameters are passed as arguments
   Return
      +CSQ <rssi>,<ber> in case of successful completion of action
      +CME ERROR: <err> in case of failure
   Generated when
      MIH Middleware Client has to get signal reception quality information about the UMTS link
   Action Upon Receipt
      The UMTS Device Driver will return the RSSI and channel BER values using the encoding specified in 3GPP TS 27.007 V5.6.0 Section 8.5
   Note
      This AT-Command (or its corresponding function call) can be used to implement Link_Get Parameters.request, whereby the return is treated as Link_Get_Parameters.confirm
   AT-Command: AT+CFUN
   Command Name: AT+CFUN
      Direction: MIH Client Middleware→UMTS Device Driver Function
   +CFUN=[<fun>[,<rst>]]
Parameters
   fun: Functionality level desired from the phone
   rst: Flag to indicate whether to reset before setting functionality level
Return
   OK in case of successful completion of action
   +CME ERROR: <err> in case of failure
Generated when
   MIH Middleware Client has to set the level of functionality (e.g. full, RX only, TX only, etc.) of the UMTS phone
Action Upon Receipt
   The UMTS Device Driver will interpret and set the level of functionality using the codes as specified in 3GPP TS 27.007 V5.6.0 Section 8.2
Note
   This AT-Command (or its corresponding function call) can be used to implement Link_Action.request, whereby the return is treated as part of Link_Action.confirm In order to support the behavior of wcdma_action_req, a new proprietary behavior for AT commands is provided. A proprietary behavior is defined to put the WCDMA modem in a receive-only state, (i.e., no TX), to cause the WCDMA modem to camp on a suitable network, and to prevent the WCDMA modem from registering to any cells. In accordance with one embodiment, a proprietary function code (fun=5) is added to existing AT Command, AT+CFUN (as exemplified here). Alternatively, a new proprietary AT Command is added with new behavior, (e.g., AT+XIDLE).

Command Name: AT+CFUN
   Direction: MIH Client Middleware→UMTS Device Driver
Function
   +CFUN=[<fun>[,<rst>]]
Parameters
   fun: Functionality level desired from the phone
   rst: Flag to indicate whether to reset before setting functionality level
Return
   OK in case of successful completion of action
   +CME ERROR: <err> in case of failure
Generated when
   MIH Middleware Client has to set the level of functionality (e.g. full, RX only, TX only, etc.) of the UMTS phone.
Action Upon Receipt
   The UMTS Device Driver interprets and set s the level of functionality using the codes as specified in 3GPP TS 27.007 V5.6.0 Section 8.2.
   Additionally, new proprietary behaviour extension (fun=5, e.g.) puts the WCDMA modem in a receive-only state (i.e., no TX). After this command is issued, the WCDMA modem camps on a suitable network without registering to it.
Note
   This AT-Command (or its corresponding function call) can be used to implement Link_Action.request, whereby the return is treated as part of Link_Action.confirm
AT-Command: AT+CGDCONT
Command Name: AT+CGDCONT
   Direction: MIH Client Middleware→UMTS Device Driver
Function
   +CGDCONT=[<cid>[,<PDP_type>[,<APN>[,<PDP_addr>[,<d_comp>[,<h_comp>[,<pd1>[[, pdN]]]]]]]]]
Parameters
   As defined in TS 27.007 V5.6.0 Section 10.1
Return
   OK
   ERROR
Generated when
   MIH Middleware Client has to create a UMTS PDP context
Action Upon Receipt
   The UMTS Device Driver will create a new UMTS PDP context and associated it with the cid provided as described in 3GPP TS 27.007 V5.6.0 Section 10.1.1
Note
   This AT-Command (or its corresponding function call) can be used to implement Link_Action.request, whereby the return is treated as part of Link_Action.confirm
AT-Command: AT+CGEQREQ
Command Name: AT+CGEQREQ
   Direction: MIH Client Middleware→UMTS Device Driver
Function
   +CGEQREQ=[<cid>[,<Traffic class>[,<Maximum bitrate UL>[,<Maximum bitrate DL>[,<Guaranteed bitrate UL>[,<Guaranteed bitrate DL>[,<Delivery order>[,<Maximum SDU size>[,<SDU error ratio>[, <Residual bit error ratio>[,<Delivery of erroneous SDUs>[,<Transfer delay>[,<Traffic handling priority>]]]]]]]]]]]]]
Parameters
   As defined in TS 27.007 V5.6.0 Section 10.1.6
Return
   OK in case of successful completion of action
   ERROR in case of failure
Generated when
   MIH Middleware Client has to specify Quality of Service (QoS) Profile for a UMTS PDP Context
Action Upon Receipt
   The UMTS Device Driver will interpret and set the QoS parameters using the codes specified in 3GPP TS 27.007 V5.6.0 Section 10.1.6
Note
   This AT-Command (or its corresponding function call) can be used to implement Link_Action.request, whereby the return is treated as part of Link_Action.confirm
AT-Command: AT+CGATT
Command Name: AT+CGATT
   Direction: MIH Client Middleware→UMTS Device Driver
Function
   +CGATT=[<state>]
Parameters
   state: Packet Domain service attach or detach request code
Return
   OK in case of successful completion of action
   ERROR in case of failure
Generated when
   MIH Middleware Client has to request an attach to or detach from the UMTS Packet Domain service Action Upon Receipt
  The UMTS Device Driver will interpret and use the attachment code as specified in 3GPP TS 27.007 V5.6.0 Section 10.1.9
  UMTS Device Driver will perform the desired attach or detach request
Note
  This AT-Command (or its corresponding function call) can be used to implement Link_Action.request, whereby the return is treated as Link_Action.confirm
AT-Command: AT+CGATT?
Command Name: AT+CGATT?
  Direction: MIH Client Middleware→UMTS Device Driver
Function
  +CGATT?
Parameters
  no parameters are passed as arguments
Return
  +CGATT: <state>
Generated when
  MIH Middleware Client has to query UMTS Packet Domain attachment status
Action Upon Receipt
  The UMTS Device Driver will return the status code as specified in 3GPP TS 27.007 V5.6.0 Section 10.1.9
Note
  This AT-Command (or its corresponding function call) can be used to implement Link_Action.request, whereby the return is treated as Link_Action.confirm
AT-Command: AT+CGREG?
Command Name: AT+CGREG?
  Direction: MIH Client Middleware→UMTS Device Driver
Function
  +CGREG?
Parameters
  No parameters are passed as arguments
Return
  +CGREG: <n>,<stat>[,<lac>,<ci>] in case of successful completion
  +CME ERROR: <err> in case of failure
Generated when
  MIH Middleware Client has to query UMTS network registration status
Action Upon Receipt
  The UMTS Device Driver will return the parameters above using the codes specified in 3GPP TS 27.007 V5.6.0 Section 7.2
Note
  This AT-Command (or its corresponding function call) can be used to implement Link_Action.request, whereby the return is treated as part of Link_Action.confirm
AT-Command: AT+CGACT
Command Name: AT+CGACT
  Direction: MIH Client Middleware→UMTS Device Driver
Function
  +CGACT=[<state>[,<cid>[,<cid>[, . . . ]]]]
Parameters
  state: status of PDP context activation (active=1/inactive=0)
  cid: numeric parameter to indicate PDP context definition Return
  OK in case of successful completion of action
  ERROR: <err> in case of failure
Generated when
  MIH Middleware Client has to activate (or deactivate) UMTS PDP context
Action Upon Receipt
  The UMTS Device Driver will use the cid codes as specified in 3GPP TS 27.007 V5.6.0 Sections 10.1.1 and 10.1.10
Note
  This AT-Command (or its corresponding function call) can be used to implement Link_Action.request, whereby the return is treated as part of Link_Action.confirm
AT-Command: AT+CGACT?
Command Name: AT+CGACT?
  Direction: MIH Client Middleware→UMTS Device Driver
Function
  +CGACT?
Parameters
  no parameters passed as arguments
Return

- +CGACT: <cid>, <state>
  [<CR><LF>+CGACT: <cid>, <state>
  [...]]

Generated when
  MIH Middleware Client has to query activation status of all defined UMTS PDP Contexts
Action Upon Receipt
  The UMTS Device Driver will return activation status codes for all defined UMTS PDP Contexts as specified in 3GPP TS 27.007 V5.6.0 Section 10.1.10
Note
  This AT-Command (or its corresponding function call) can be used to implement Link_Action.request, whereby the return is treated as part of Link_Action.confirm
AT-Command: AT+CGDCONT?
Command Name: AT+CGDCONT?
  Direction: MIH Client Middleware→UMTS Device Driver
Function
  +CGDCONT?
Parameters
  no parameters are passed as arguments
Return

- +CGDCONT: <cid>, <PDP_type>, <APN>,<PDP_addr>, <d_comp>, <h_comp>[,<pd1>[,...[,pdN]]]
  [<CR><LF>+CGDCONT: <cid>, <PDP_type>, <APN>,<PDP_addr>, <d_comp>, <h_comp>[,<pd1>[,...[,pdN]]]
  [...]]

Generated when
  MIH Middleware Client has to query settings for all defined UMTS PDP Contexts
Action Upon Receipt
  The UMTS Device Driver will return the current settings for all defined UMTS PDP Contexts using the parameters above as specified in 3GPP TS 27.007 V5.6.0 Section 10.1.1

Note
   This AT-Command (or its corresponding function call) can be used to implement Link_Action.request, whereby the return is treated as part of Link_Action-.confirm AT-Command: AT+CGDATA
Command Name: AT+CGDATA
   Direction: MIH Client Middleware→UMTS Device Driver
Function
   +CGDATA=[<L2P>[<cid>[,<cid>[, . . . ]]]]
Parameters
   L2P: parameter describing Layer 2 protocol to be used between TE and MT
   cid: numeric parameter to indicate PDP context definition
Return
   CONNECT in case of successful completion of action
   ERROR: <err> in case of failure
Generated when
   MIH Middleware Client has to cause the UMTS stack to enter data state
Action Upon Receipt
   The UMTS Device Driver will use the argument codes as specified in 3GPP TS 27.007 V5.6.0 Sections 10.1.1 and 10.1.12
Note
   This AT-Command (or its corresponding function call) can be used to implement Link_Action.request, whereby the return is treated as part of Link_Action-.confirm AT-Command: AT+XDTBT
Command Name: AT+XDTBT
   Direction: MIH Client Middleware→UMTS Device Driver
Function
   +XDTBT?
Parameters
   no parameters are passed as arguments
Return
   +XDTBT: <sent_bytes>, <received_bytes>
Generated when
   MIH Middleware Client has to query the UMTS data transfer statistics
1Action Upon Receipt
   The UMTS Device Driver will return the total number of bytes sent and total number of bytes received as long integers
Note
   This AT-Command (or its corresponding function call) can be used to implement a mechanism to identify whether there is an active session on the UMTS connection Although features and elements are described in example embodiments in particular combinations, each feature or element can be used alone without the other features and elements of the example embodiments or in various combinations with or without other features and elements. The methods or flow charts described herein may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, digital versatile disks (DVDs), and the like.

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), any host computer, or the like. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A wireless transmit receive unit (WTRU) comprising:
   a first modem processor configured to establish a wireless communications link using a first technology;
   a second modem processor configured to establish a wireless communications link using a second technology; and
   an application processor including:
      an operating system (OS) configured to run on the application processor, wherein the OS provides an application programming interface (API), and
      a media independent handover (MIH) client configured to run on the application processor, wherein the MIH client includes a first modem interface configured to communicate with the first modem processor via the API, and a second modem interface configured to communicate with the second modem processor via the API, and wherein the MIH client is configured to discover an MIH server using dynamic host configuration protocol (DHCP) or domain name system (DNS);
   wherein the first modem processor is configured to:
      send a report indicating that a connection is expected to go down in a certain time interval; and
      send a report indicating that a link parameter has crossed a threshold.

2. The WTRU of claim 1, wherein the MIH client is configured to:
   send a link establishment request from the first modem using the API;
   start a MIH session;
   receive a link termination report via the API, the report indicating that a link is expected to be terminated in a certain time interval;
   send a link establishment request to the second modem using the API; and
   perform a handover from the first modem to the second modem.

3. The WTRU of claim 1, wherein the application processor is configured to run a plurality of high level applications, and wherein the MIH client is configured to communicate with the plurality of high level applications.

4. The WTRU of claim 1, wherein the application processor is configured to run a plurality of network protocols, and wherein the MIH client is configured to communicate with the plurality of network protocols.

5. The WTRU of claim 1, wherein the first modem processor comprises:
- a protocol stack configured to transmit and receive messages according to a first protocol;
- a driver configured to interact with the API; and
- a real time operating system (RTOS) configured to provide hardware abstraction, scheduling, networking, and low level services.

6. The WTRU of claim 1, wherein the first modem processor is a Universal Mobile Telecommunications System (UMTS) modem processor and the first protocol is UMTS.

7. The WTRU of claim 1, wherein the second modem processor is a Wireless Broadband (WiBro) modem processor and the second protocol is WiBro.

8. The WTRU of claim 1, wherein the MIH client comprises a porting layer configured to interface between MIH client API calls and the OS API.

9. The WTRU of claim 1, wherein the API is a Win32 API.

10. The WTRU of claim 1, wherein the MIH client is configured to:
- send a request to the first modem to set a threshold for an link parameter; and
- receive a measurement report from the first modem, the measurement report indicating that the threshold has been crossed.

11. The WTRU of claim 1, wherein the MIH client is configured to order the first modem to perform a link layer connection change; and the first modem is configured to indicate a status of the link layer connection change.

12. The WTRU of claim 1, wherein the MIH client is configured to request a quality of service (QoS) parameter for a target application from the first modem; and the first modem is configured to respond with the requested QoS parameter.

13. The WTRU of claim 1, wherein the MIH client is configured to request a signal quality measurement from the second modem; and the second modem is configured to send a report indicating the requested signal strength measurement.

14. The WTRU of claim 1, wherein the MIH client is configured to request that the second modem go into one of an idle mode or a connected mode; and
the second modem is configured to indicate a status.

15. The WTRU of claim 1, wherein the API is configured to provide a COM port interface between the MIH client and the first modem.

16. The WTRU of claim 15, wherein the MIH client is configured to communicate with the first modem via the COM port interface.

17. The WTRU of claim 1, wherein the MIH client is further configured to discover a Proxy Call State Control Function (P-CSCF) using DHCP or DNS.

18. A method for use in a wireless transmit receive unit (WTRU), comprising:
- establishing a wireless communications link using a first technology using a first modem processor;
- establishing a wireless communications link using a second technology using a second modem processor;
- running an operating system (OS) on an application processor, wherein the OS provides an application programming interface (API), and
- running a media independent handover (MIH) client on the application processor, wherein the MIH client includes a first modem interface configured to communicate with the first modem processor via the API;
- the MIH client discovering an MIH server using dynamic host configuration protocol (DHCP) or domain name system (DNS);
- the first modem processor sending a report indicating that a connection is expected to go down in a certain time interval; and
- the first modem processor sending a report indicating that a link parameter has crossed a threshold.

* * * * *